(12) United States Patent
Wippermann et al.

(10) Patent No.: US 10,425,567 B2
(45) Date of Patent: Sep. 24, 2019

(54) APPARATUS AND METHOD FOR DETECTING AN OBJECT AREA WITH A MULTI-APERTURE DEVICE IN A FLAT HOUSING

(71) Applicant: Fraunhofer-Gesellschaft zur Foerderung der angewandten Forschung e.V., Munich (DE)

(72) Inventors: Frank Wippermann, Meiningen (DE); Andreas Brueckner, Jena (DE); Andreas Braeuer, Schloeben (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 148 days.

(21) Appl. No.: 15/400,067

(22) Filed: Jan. 6, 2017

(65) Prior Publication Data

US 2017/0118388 A1    Apr. 27, 2017

Related U.S. Application Data

(63) Continuation of application No. PCT/EP2015/065402, filed on Jul. 6, 2015.

(30) Foreign Application Priority Data

Jul. 9, 2014    (DE) .................... 10 2014 213 371

(51) Int. Cl.
  *H04N 5/225*    (2006.01)
  *H04N 5/341*    (2011.01)
  (Continued)

(52) U.S. Cl.
  CPC ....... *H04N 5/2259* (2013.01); *G02B 13/0065* (2013.01); *G03B 17/17* (2013.01);
  (Continued)

(58) Field of Classification Search
  CPC .................................................. H04N 5/2259
  See application file for complete search history.

(56) References Cited

U.S. PATENT DOCUMENTS

| 8,629,930 B2 | 1/2014 | Brueckner et al. |
| 2006/0187338 A1 | 8/2006 | May et al. |

(Continued)

FOREIGN PATENT DOCUMENTS

| CN | 102566021 A | 7/2012 |
| DE | 102009049387 A1 | 4/2011 |

(Continued)

OTHER PUBLICATIONS

Venkataraman, K. et al., "PiCam: An Ultra-Thin High Performance Monolithic Camera Array", ACM Transactions on Graphics (TOG). Proceedings of ACM SIGGRAPH Asia 2013, vol. 32, Issue 6, Article No. 166., pp. 1-13. http://www.pelicanimaging.com/technology/PiCam_sa13.pdf, Nov. 2013.

(Continued)

*Primary Examiner* — Gary C Vieaux
(74) *Attorney, Agent, or Firm* — Perkins Coie LLP; Michael A. Glenn

(57) ABSTRACT

The invention describes an apparatus for detecting an object area with a flat housing having a first main side, a second main side, a lateral side; and a multi-aperture device with a plurality of laterally juxtaposed optical channels facing the lateral side, wherein each optical channel is configured to detect a respective partial area of the object area through the lateral side or along an optical axis of the respective optical channel that is deflected between a lateral course within the housing and a non-lateral course outside the housing, wherein the partial areas of the optical channels cover the object area.

16 Claims, 16 Drawing Sheets

(51) Int. Cl.
  *G02B 13/00* (2006.01)
  *G03B 17/17* (2006.01)
  *H04N 5/232* (2006.01)

(52) U.S. Cl.
  CPC ......... *H04N 5/2252* (2013.01); *H04N 5/2254* (2013.01); *H04N 5/2258* (2013.01); *H04N 5/23293* (2013.01); *H04N 5/3415* (2013.01)

(56) References Cited

U.S. PATENT DOCUMENTS

| | | |
|---|---|---|
| 2008/0018591 A1 | 1/2008 | Pittel et al. |
| 2009/0002797 A1 | 1/2009 | Kwong et al. |
| 2009/0021900 A1 | 1/2009 | Camp, Jr. et al. |
| 2009/0053618 A1 | 2/2009 | Goehnermeier |
| 2010/0328471 A1* | 12/2010 | Boland ............... G02B 13/004 348/207.99 |
| 2011/0228142 A1 | 9/2011 | Brueckner et al. |
| 2012/0040716 A1 | 2/2012 | Kuncl et al. |
| 2014/0055624 A1 | 2/2014 | Gaines et al. |
| 2014/0111650 A1 | 4/2014 | Georgiev et al. |
| 2016/0255330 A1* | 9/2016 | Wippermann ....... H04N 5/2258 348/49 |

FOREIGN PATENT DOCUMENTS

| | | |
|---|---|---|
| DE | 102013222780 B3 | 4/2015 |
| EP | 2177869 A2 | 4/2010 |
| GB | 2368992 A | 5/2002 |
| JP | 2001033850 A | 2/2001 |
| JP | 2005176940 A | 7/2005 |
| JP | 2011199757 A | 10/2011 |
| KR | 10-20070116104 A | 12/2007 |
| WO | 2009151903 A3 | 3/2010 |
| WO | 2013101556 A1 | 7/2013 |

OTHER PUBLICATIONS

Zax, David, "A Smart-Phone Camera that offers more than Megapixels", Technology Review; Pelican Imaging; 2011, 2 pages.

* cited by examiner

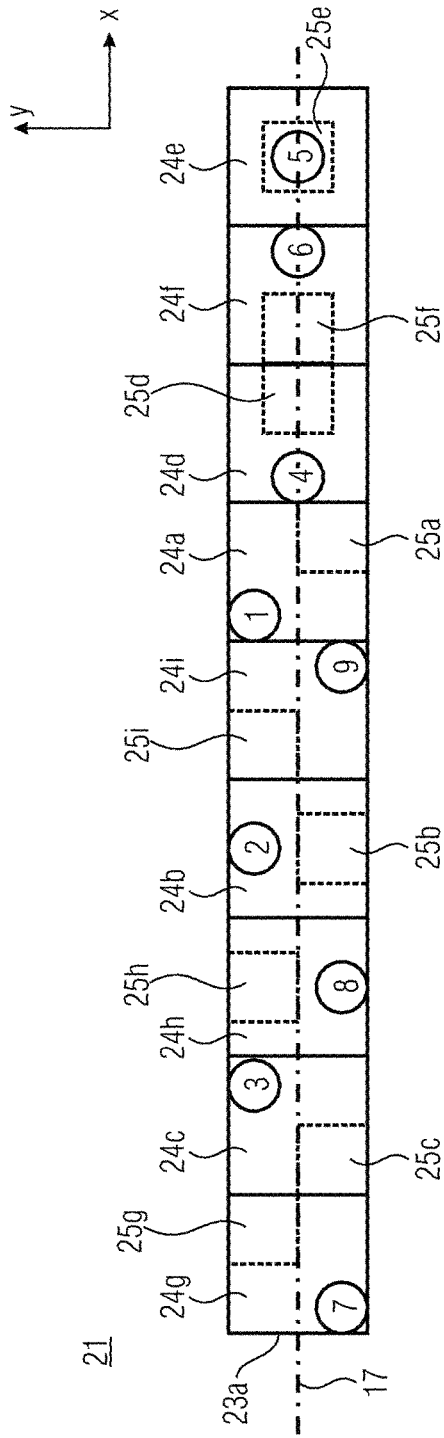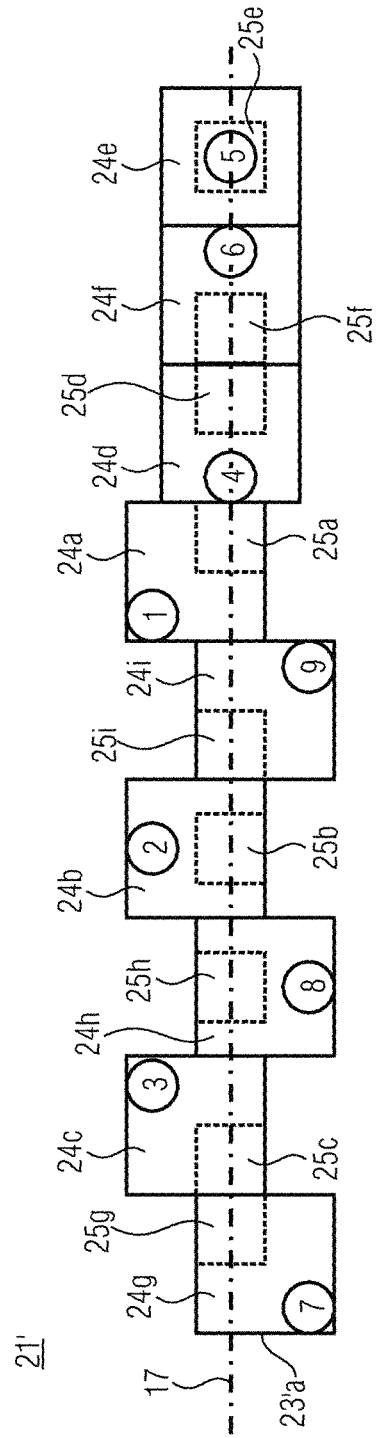
Fig. 4a
Fig. 4b

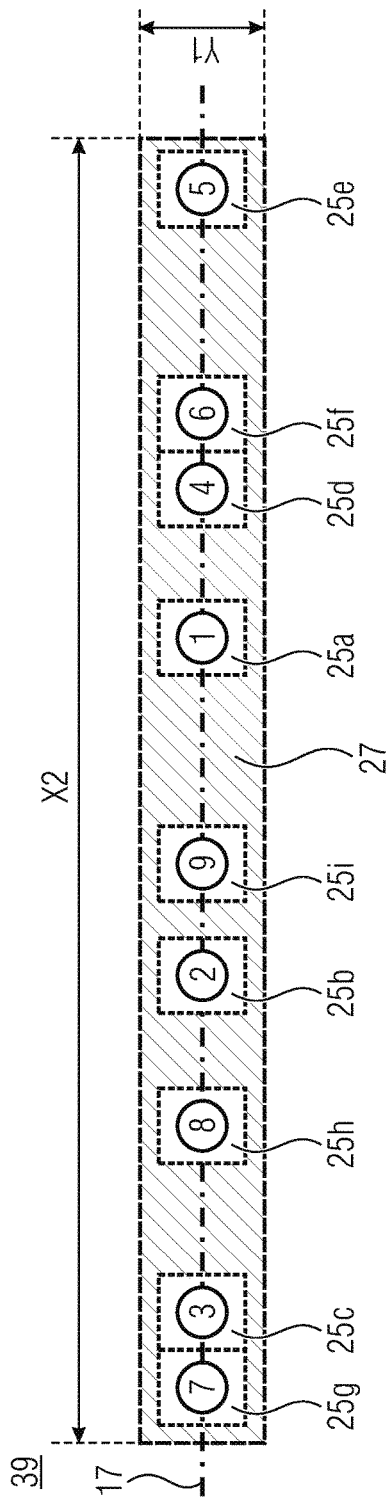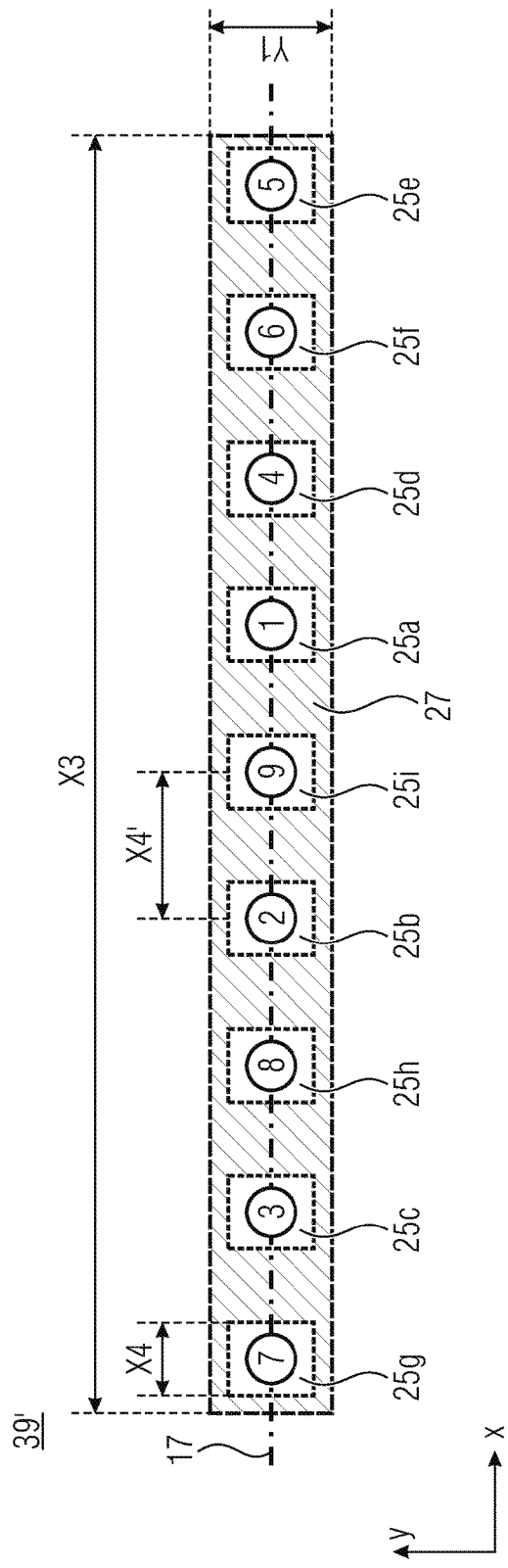
Fig. 4c
Fig. 4d

1st STATE

2nd STATE

1st STATE

2nd STATE

APPARATUS AND METHOD FOR DETECTING AN OBJECT AREA WITH A MULTI-APERTURE DEVICE IN A FLAT HOUSING

CROSS-REFERENCE TO RELATED APPLICATIONS

This application is a continuation of copending International Application No. PCT/EP2015/065402, filed Jul. 6, 2015, which claims priority from German Application No. 10 2014 213 371.8, filed Jul. 9, 2014, which are each incorporated herein in its entirety by this reference thereto.

The invention relates to an apparatus for detecting an object area.

BACKGROUND OF THE INVENTION

Nowadays, many mobile phones or smartphones are provided with at least two camera modules. One camera module frequently comprises exactly one optical channel for detecting a partial area of the object area. A primary camera that can be optimized for capturing photos or video is, for example, on the front side or second main side of the apparatus facing away from the user and a secondary camera that can be optimized, for example, for video telephony, is provided on the rear side or first main side of the apparatus facing the user. Thus, two object areas independent of one another can be detected: a first object area facing the front side of the housing as well as a second object area facing the rear side. For illustration purposes, FIG. 11 shows a conventional camera and two camera modules (indicated by a circle, secondary camera (video telephony) on the left, primary camera (photo camera) on the right), respectively, in a smartphone according to conventional technology.

In the course of increasing miniaturization, one of the main design objects is the reduction of the thickness of smartphones or mobile phones. Here, a problem occurs with the integration of the camera module and the camera modules, respectively: due to the physical laws of optics, for each given camera module having the lateral dimensions X (extended in x-direction) and Y (extended in y-direction) a lower limit results for the height of the entire camera module Z (extended in z-direction). This height Z determines the minimum thickness of the entire apparatus, for example when orienting the height Z along a thickness of the smartphone or mobile phone. In other words, the camera frequently determines the minimum thickness of the smartphone.

An option for reducing the installation height of cameras is the usage of multi-aperture cameras including a plurality of juxtaposed imaging channels. Here, superresolution methods are used, whereby the installation height can be halved. Basically, two principles are known based, on the one hand, on optical channels each transmitting the entire field of view (Pelican Imaging, i.a. WO 2009151903 A3, TOMBO Japan) and, on the other hand, only imaging a partial area of the total field of view (DE102009049387 and based thereon application DE102013222780).

A multi-aperture device can include an image sensor having one image sensor area per channel. An optical channel of the multi-aperture device is configured to project a partial area of the object area on a respective image sensor area and for this, the same comprises an optical element or an imaging optics, such as a lens, a portion of a decentered lens or a freeform surface having an optical center.

Further, with a single camera module and hence a single optical channel, it is not possible to obtain in depth information on the object area detected thereby. For this, at least two camera modules are necessitated, wherein the depth resolution can be maximized with increasing distance of the camera modules with respect to one another. The minimum installation height Z may possibly be reduced when multi-aperture cameras with superresolution and a linear arrangement of the channels are used (see again DE102009049387 and based thereon application DE102013222780). Here, however, the miniaturization depends on a superresolution factor usually not exceeding 2.

The integration of several camera modules necessitates additional space which is limited, for example when incorporating the camera module in the rear side facing the user for detecting an object area, which is, for example, facing the rear side in many common smartphones already by the additional integration of a screen in the same side of the housing.

Further, it is basically possible to reduce the installation height Z of the individual camera optics by reducing the focal length f of the individual camera optics. However, it is well known to the person skilled in the art that this approach only results in a reduction of the imaging quality as regards to resolution and/or image noise when reducing the pixel size or reducing the number of pixels.

SUMMARY

According to an embodiment, an apparatus for detecting an object area may have: a flat housing having a first main side, a second main side and a lateral side; and a multi-aperture device, having: a plurality of laterally juxtaposed optical channels facing the lateral side, wherein each optical channel is configured to detect a respective partial area of the object area through the lateral side or along an optical axis of the respective optical channel that is deflected between a lateral course within the housing and a non-lateral course outside the housing, wherein the partial areas of the optical channels cover the object area.

Another embodiment may have a method for detecting an object area with an inventive apparatus.

The core idea of the present invention is the finding that an apparatus for detecting an object area can be made thinner or, when having a similar thickness, the imaging quality can be improved in that for each channel the detection of a respective partial area of the object area is performed through a lateral side (edge side) of the apparatus or along a respective optical axis deflected between a lateral course within the housing and a non-lateral course outside the housing. An extension of each channel along a depth (z) direction can be arranged essentially in parallel to a main side, such as front or rear side of the apparatus for object detection, such that a thickness of the apparatus for object detection is influenced by an extension of the camera module along the x- or y-direction and can be independent of an extension of the camera module along the z-direction.

According to an embodiment, a multi-aperture device including at least two optical channels and one optical axis each allocated to a respective optical channel is arranged in an apparatus for object detection comprising at least one lateral side as well as a first main side and a second main side such that the detection of a partial area of an object area can be performed through the lateral side. If the optical axes are deflected between a lateral course and a non-lateral course, the object area can face, for example, the first or second main side.

BRIEF DESCRIPTION OF THE DRAWINGS

Embodiments of the present invention will be detailed subsequently referring to the appended drawings, in which:

FIG. 4a is a schematic top view of a section and portion, respectively, of the multi-aperture device of FIG. 3a;

FIG. 4b is a schematic top view of the portion of FIG. 4a where the optical channels have a lateral offset perpendicular to a line direction, such that the image sensor areas of the individual optical channels are arranged in the same position perpendicular to the line direction;

FIG. 4c is a schematic top view of a substrate having a plurality of image sensor areas with different distances to one another in an arrangement according to FIG. 4b;

FIG. 4d is a schematic top view of a substrate having a plurality of image sensor areas with equal distances to one another;

DETAILED DESCRIPTION OF THE INVENTION

Before embodiments of the present invention will be discussed in more detail below with respect to the drawings, it should be noted that identical, functionally equal or equal elements, objects and/or structures are provided with the same reference numbers in the different figures, such that the description of these elements illustrated in the different embodiments is inter-exchangeable or inter-applicable.

Figure 1:
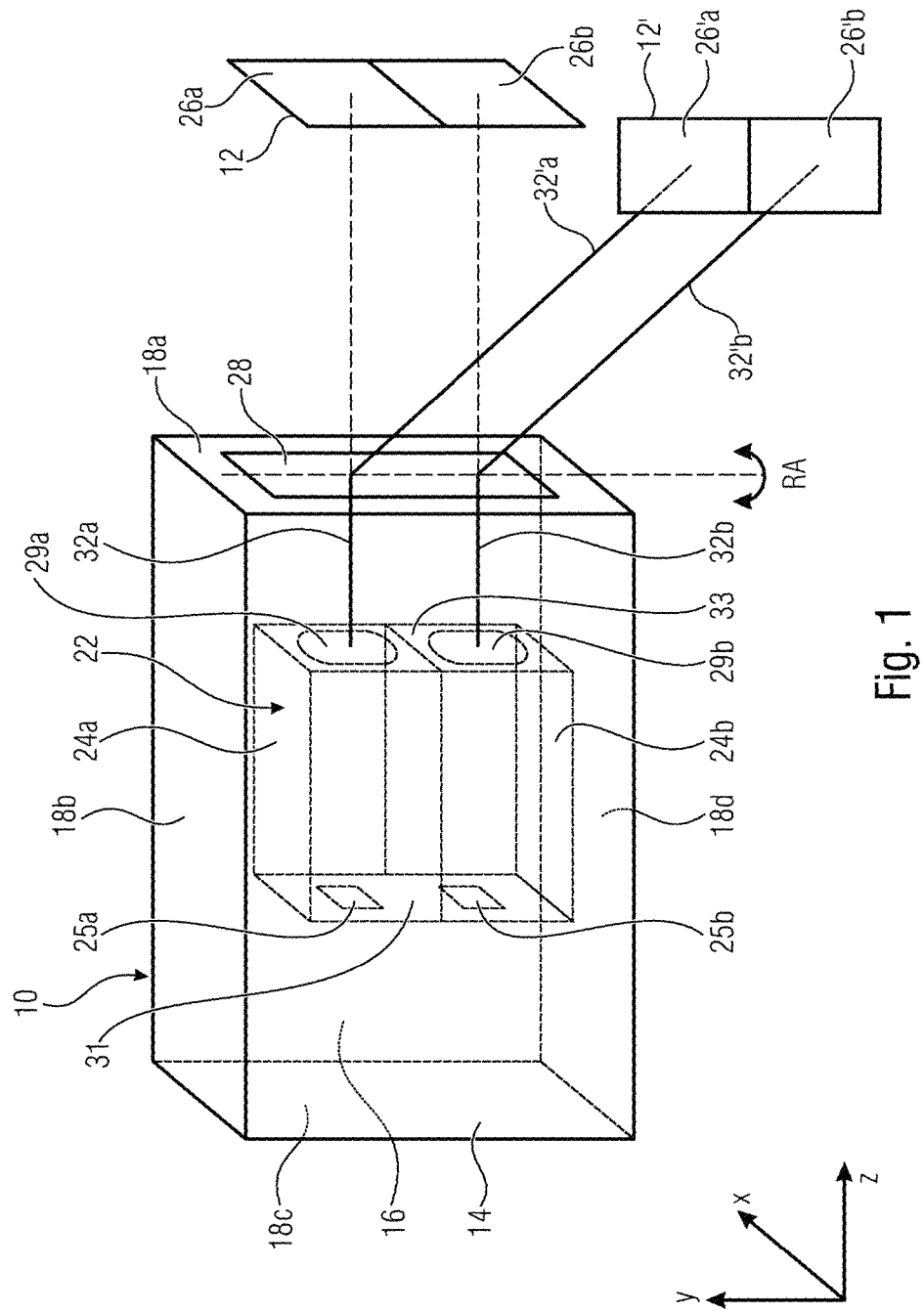
FIG. 1 is a schematic perspective view of an apparatus for detecting an object area comprising a multi-aperture device having two optical channels.

FIG. 1 shows a schematic perspective view of an apparatus 10 for detecting an object area 12. The apparatus 10 comprises a flat housing having a first main side 14 and a second main side 16 arranged on the opposite side. Further, the apparatus 10 comprises lateral sides 18a-d that are arranged between the first main side 14 and the second main side 16.

The first main side 14 and the second main side 16 are each arranged exemplarily in a plane running parallel to a plane spanned by a y-axis and a z-axis. The lateral side 18a as well as the object area 12, in contrast, are each parallel to a plane spanned by an x-axis and the y-axis. In other words, the lateral side 18a is a lateral face arranged between the two main sides 14 and 16 of the apparatus 10. The lateral side 18a and lateral sides 18b-d can also be referred to as front sides.

The x-axis, y-axis and z-axis are arranged orthogonally to one another in space and are connected to one another in clockwise direction. It is obvious that the main and/or lateral sides can have bends and/or can be formed with any surface geometry, such as round, elliptical, polygonal, as freeform area or a combination of the same. Alternatively, the apparatus 10 can have a different number of main and/or lateral sides, for example only one, two or three lateral sides.

The apparatus 10 comprises a multi-aperture device 22 here including, merely exemplarily, two optical channels 24a and 24b. The multi-aperture device 22 can also include any other number of optical channels, such as but not exclusively, 6, 8, 10 or more.

Each channel 24a, b includes optics 29a,b here illustrated, merely exemplarily, as comprising a circular aperture and lying within an optics plane 33 and an image sensor area 25a,b. The image sensor areas 25a and 25b are arranged in an image plane 31 and each optics 29a,b projects the respective partial area of the object area on the respective sensor area. An extensive discussion on the effects of different planar extensions and/or positionings of the image sensor areas will follow in the descriptions of FIGS. 3a and 4a-4. The image plane 31 is arranged parallel to the lateral side 18a and the apertures of optics 29a,b as well as the optics plane 33. However, alternatively, also the lateral side 18b or one of the other sides could be used as viewing passage for detecting a different object plane than the one shown in FIG. 1, or an arrangement slightly tilted relative to the lateral side 18b is used, for example, in order to "look" slightly towards the bottom or top with the array of channels.

Further, it should be noted that alternative implementations of multi-aperture devices as described below can include equally structured optical channels. For clarity reasons, in the following embodiments, optical channels are merely indicated by dotted cuboids.

The multi-aperture device 22 is arranged between the first and second main sides 14 and 16 such that the image plane 31 is parallel to and between the lateral sides 18a and 18c.

The optical axis 32a is allocated to the optical channel 24a and the optical axis 32b is allocated to the optical channel 24b. Here, exemplarily, the optical axes 32a and 32b are illustrated running approximately parallel and inside the housing mainly along the z-axis, wherein, however, different configurations are possible, such as a divergent course of the axes 32a and 32b from the multi-aperture device 22 towards the object area 12 or the side 18a, respectively.

The channels 24a,b are juxtaposed along the transversal direction y and oriented along the lateral direction z, i.e. facing the lateral side 18a. The same are, for example, on a common line along y, such as with the optical centers of their optics 29a,b, in order to form a one-dimensional array or a line or row of optical channels extending along a longitudinal orientation of the lateral side 18a.

Each of the optical channels 24a and 24b is configured to detect a partial area 26a and 26b, respectively, of the object area 12 along the respective optical axes 32a and 32b, respectively. The partial areas 26a and 26b can each cover entirely the total object area 12. In the embodiments described below in more detail, the channels each cover only partly or together entirely the total object area 12. In the latter case, it is possible that the areas overlap or directly abut on one another.

Further, it should be noted that the division of the object area 12 into the partial areas 26a and 26b shown herein is merely exemplary. It is shown, for example, in FIG. 1 that centers of the partial areas 26a and 26b are juxtaposed in y-direction in the same order as the allocated optical channels 24a and 24b, respectively, i.e. that the partial areas 26a and 26b, respectively, are virtually also arranged along a line parallel to y to form a one-dimensional array. Theoretically, another arrangement would also be possible, such as juxtaposition transversal to the juxtaposition direction y of the channels 24a,b, namely along x. If the number of channels and partial areas, respectively, is greater, it could also be the case that the partial areas scanned by the channels form a two-dimensional array, for example with their centers. Thereby, the partial areas can mutually overlap or not as mentioned above.

Further, exemplarily, the apparatus 10 comprises a beam deflecting element 28 that is configured to reflectively deflect the optical axes 32a and 32b of the optical channels 24a and 24b and to relocate the object area 12. In FIG. 1, the beam-deflecting element 28 is exemplarily arranged at the lateral side 18a.

The beam-deflecting element 28 can be stationary or pivoted or tiltable around an axis of rotation RA running in the direction of the y-axis for allowing reflective deflection of the optical axes 32a and 32b. Such a tilting or deflective deflection can possibly also be performed individually for each individual optical axis 32a and 32b, respectively, and/or also such that only the course of one of the optical axes is changed, i.e. tilted or deflected.

Reflective deflection of the optical axes 32a and 32b can result in an amended course of the optical axes 32a and 32b each toward the optical axes 32'a and 32'b such that the optical channels 24a and 24b are configured to detect an object area 12' with partial areas 26'a and 26'b which is relocated with respect to the object area 12, for example by rotation around the axis RA or an axis parallel thereto, when the optical channels 32a and 32b are deflected at the beam deflecting element 28. This means that the detected object area 12 can be shifted in space by the beam deflecting element 28 by means of Reflective deflection. In other words, by means of the reflective deflection, the object area 12 can be projected on the object area 12' and vice versa. Further, the deflection has the effect that the optical axes 32a and 32b are deflected between a lateral course along a first direction, the z-direction, for example, and a non-lateral course along a second direction which can be influenced by the beam-deflecting element 28. The partial areas 26'a and 26'b can cover the object area 12'.

It is an advantage of the embodiment shown in FIG. 1 that a thickness of the apparatus 10 for object detection can be influenced by an extension of the multi-aperture device 22 in direction of the x or y-axis and can be independent of an extension of the multi-aperture device in the direction of the z-axis. In other words, the lateral sides 18a-d can hence have a small extension in x-direction.

It is another advantage of this embodiment that, by arbitrary optical deflection of the optical axes, object areas can be detected that are arbitrarily arranged or positioned in space. Alternatively, it is also possible that more than one object area, for example two or three different and/or differently positioned or oriented object areas can be detected, which can be obtained by channel-wise or channel group-wise differing implementation of the beam-deflecting element 28. However, the deflectability of the apparatus 10 is only optional and can also be omitted as described below.

Both the multi-aperture device 22 and the beam deflecting element 28 can also be arranged at a different position within the apparatus 10. It is also possible that both the multi-aperture device 22 and the beam-deflecting element 28 are arranged in the lateral side 18a or in a different lateral side 18b-d.

Further, the multi-aperture device 22 can include more than two optical channels to which a respective plurality of optical axes can be allocated. The plurality of optical channels can be configured to detect two or more partial areas of an object area. It is also possible that the individual optical channels are arranged in at least two groups, wherein, for example, a first group of optical channels can be configured to detect a first partial area of the object area and the second group of optical channels can be configured to detect a second partial area of the object area. This can be used for increasing the resolution, in that for example the optical channels of one group scan the respective partial area offset to one another by a subpixel distance and methods of superresolution are applied.

The beam-deflecting element 28 can, for example, be a mirror or a (partly) reflecting continuous or discontinuous surface. Alternatively, a different beam-deflecting or beam-forming element could be used, such as a prism, a lens, a refractive or defractive lens element or a combination of such elements.

The apparatus or device 10 can, for example, be a camera, a mobile phone or smartphone, a screen or TV device, a computer screen or any apparatus suitable for image and/or video capturing or for detecting an object area.

Figure 2:
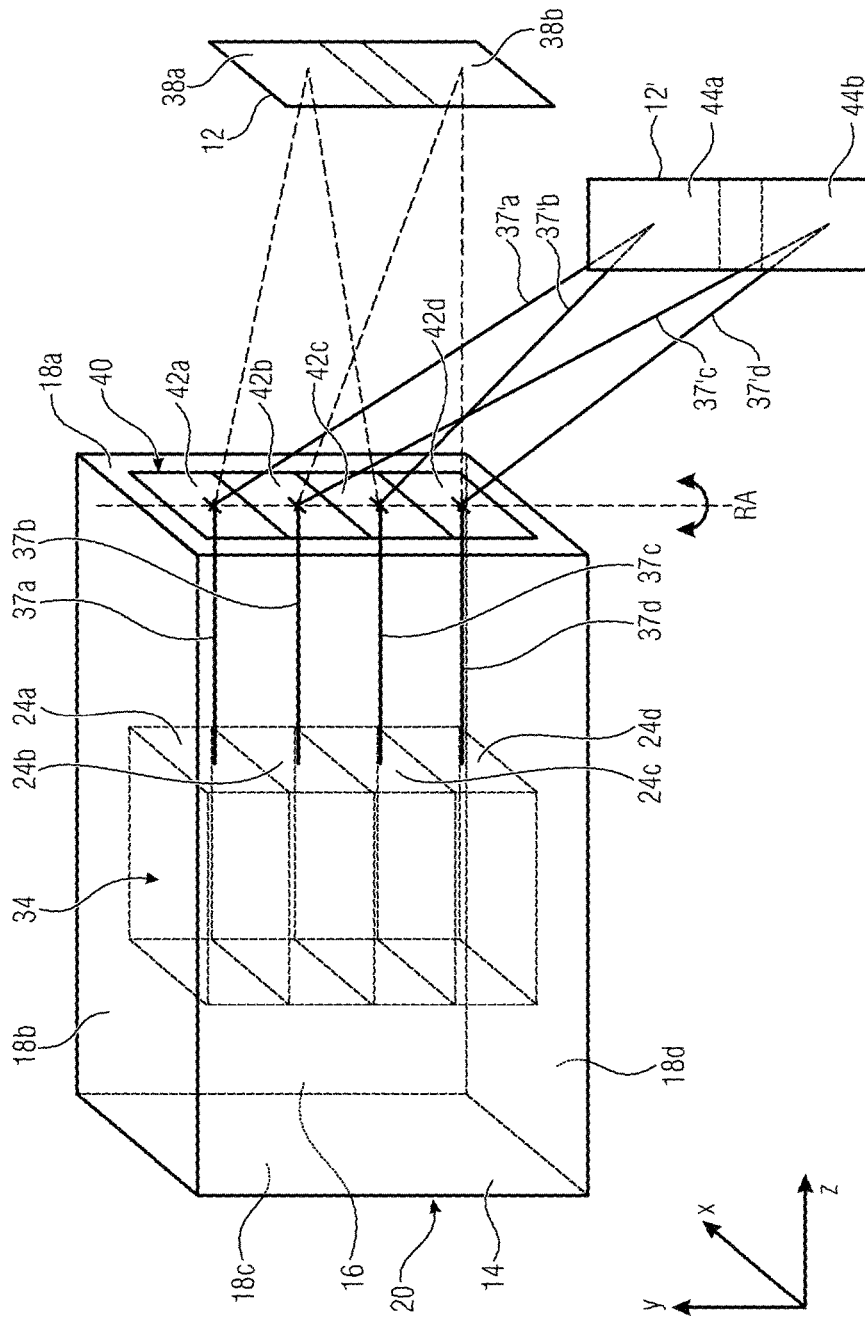
FIG. 2 is a schematic perspective view of an apparatus for detecting an object area comprising a multi-aperture device having four optical channels.

FIG. 2 shows a schematic perspective view of an apparatus for object detection 20 which again comprises the first main side 14, the second main side 16 as well as the lateral sides 18a-d. Further, the apparatus 20 comprises a multi-aperture device 34. Here, the multi-aperture device 34 includes exemplarily four optical channels 24a, 24b, 24c and 24d. The multi-aperture device 34 is arranged in the apparatus 20 such that optical axes 37a, 37b, 37c and 37d respectively allocated to the optical channels 24a-d each run laterally or in z-direction towards the lateral side 18. Here, the individual optical axis can be parallel in sections, for example between the multi-aperture device 34 and a beam-deflecting element arranged in the lateral side 18a, or the same can be divergent. The optical channels 24a-d are configured to detect the object area 12. The object area 12 is arranged parallel to the lateral side 18a and includes the partial areas 38a and 38b which partly overlap exemplarily. Concerning further alternatives of the arrangement of the partial areas within the object area 12, reference is made to the statements with regard to FIG. 1.

A first group of optical channels includes the optical channels 24a and 24c, while a second group of optical channels includes the optical channels 24b and 24d. The first group of optical channels is configured to detect the first partial area 38a of the object area 12. The second group of optical channels is configured to detect the second partial area 38b of the object area 12.

The beam-deflecting element 40 includes partial elements 42a, 42b, 42c and 42d. Reflective deflection of the optical axes 37a-d towards the optical axes 37'a-d can be performed by means of the partial elements 42a-d, such that the first group of optical channels detects a partial area 44a of a second object area 12' and the second group of optical channels detects a partial area 44b of the object area 12'. The partial areas 44a and 44b can overlap partly or completely.

The multi-aperture device 34 can also include any other number of optical channels, such as, but not exclusively, 6, 8, 10 or more. Here, a number of optical channels of the first group can be equal to a number of optical channels of the second group, but also any other division of optical channels into a plurality of groups is possible. Here, the respective group of optical channels can be configured such that detection of a plurality of differently positioned and/or oriented object areas is enabled such that the respective group each detects a partial area of the respective object area. Partial or complete overlapping of respective partial areas of a detected object area can result, for example in an improved (depth) resolution.

Further, the partial elements 42a-d can be configured such that the same can deflect optical axes 37a-d allocated to the individual optical channels 24a-d in a non-lateral direction. As described, the non-lateral areas can be obtained by different angles of the individual areas, but also by the channel-wise different lateral offsets of the respective image areas and their allocated optics, as in the previous solutions. This can be performed individually for each single optical axis 37a-d, but also for individual groups of optical channels and axes, respectively. Individual deflection of individual optical axes can be obtained, for example, when the partial elements 42a-d have a differing inclination with respect to the lateral side 18a. It is possible that the partial elements 42a-d are configured to be tiltable independent of one another around an axis of rotation RA arranged in the lateral side 18a running in y-direction. Individual tilting of the individual partial elements 42a-d around an arbitrarily oriented axis of rotation or a plurality of axes of rotation oriented differently and/or positioned differently to one another is possible. The individual partial elements 42a-d can further be configured such that configuration and tilting, respectively, can be performed, for example mechanically by a user or in an automated manner by a respective control apparatus.

It is an advantage of this embodiment that the apparatus 20 can detect a variable object area while maintaining position and orientation. Simultaneous detection of a plurality of differently positioned object areas is also possible. A multi-aperture device having at least two optical channels can further be configured to capture depth information of a respectively detected object area.

The following FIGS. 3a-b and 4a-f each show perspective top views of optical channels. In this regard, it should be noted that the apertures of the optics are exemplarily illustrated as being square by solid lines. Here, one aperture is each allocated to one optical channel 24a-i. For clarity reasons, only the optical channels 24a-i are provided with reference numbers in the following figures.

Figure 3A:
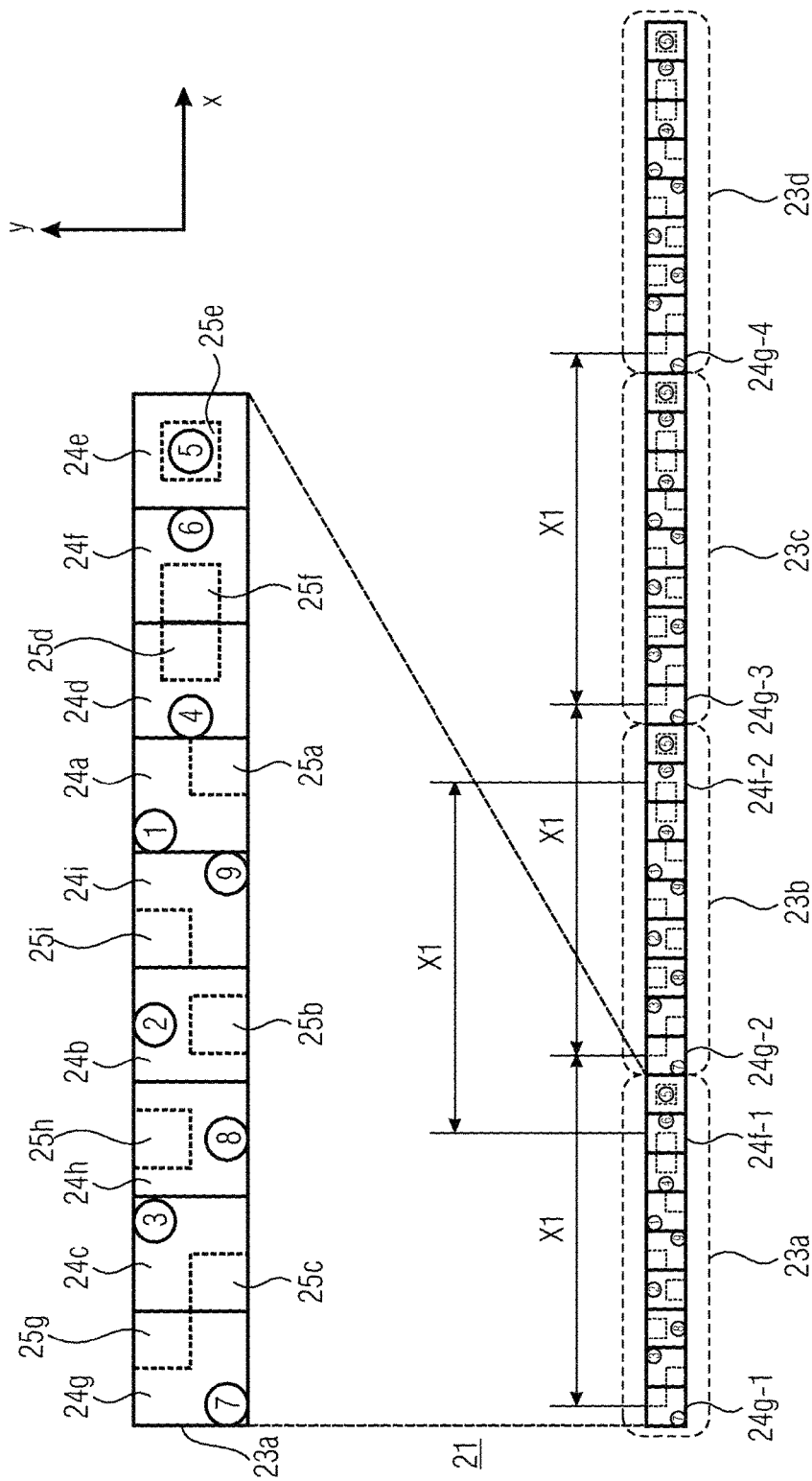
FIG. 3a is a schematic top view of a multi-aperture device having a plurality of optical channels and image sensor areas in a line-shaped structure.

In a bottom part of the figure, FIG. 3a shows exemplarily a schematic top view of a multi-aperture device 28 having a plurality of groups 23a, 23c and 23d of optical channels 24a-i, scanning different partial areas of the object areas in groups. Here, exemplarily, each group 23a-d of optical channels 24a-i is structured identically. All channels of all groups are arranged along a line, such that first the optical channels 24a-i occupy, juxtaposed, a first portion 23a of the multi-aperture device 21, then, the optical channels 24a-1, juxtaposed, occupy a next second portion 23b along the line, etc.

In a top part of the figure, FIG. 3a shows a schematic detailed view of a portion 23a of the multi-aperture device 21. An optical channel 24a-i is, for example, configured to respectively detect a partial area of the object area and includes respectively one image sensor area 25a-i on the image converter as indicated by the dotted lines within the optical channels. The area of a respective image sensor area 25a-i of an optical channel 24a-i can be smaller than the area of the respective optical channel 24a-i. The image sensor areas 25a-i of all portions 23 can be arranged on a common substrate (single chip). As indicated by the different orientations or positions of the image sensor areas 25a-i with regard to the optical centers of their optical channels 24a-i, the optical channels 24a-i have a differing viewing angle in each portion, i.e. the optical channels 24a-i are configured to detect a differing partial area of the object area. Here, it is assumed exemplarily in FIG. 3 that the optical centers are arranged centrally with regard to the apertures of the optics, which could, however, also be implemented differently. As also indicated by the squares drawn by dotted lines and the numberings of the optical channels, the optical channels 24a-i are arranged such that adjacent partial areas of the object area, such as (7) and (8) and (9) overlap (reference number (1) to (9) are illustrated in this figure and the following figures as natural numbers 1 to 9 surrounded by a circle). Overlapping of the partial areas allows evaluation of the connections, i.e. the same image content in different partial areas in order to infer depth information and to extract image information from partial images and in that way assemble a total image of a total object. Simply put, the image sensor areas 25a-i are illustrated in x- and y-direction with a dimension of 50% of the optical channels 24a-i. Alternatively, the dimensions of the image sensor area 25a-i can have any ratio to the dimensions of the optical channels 24a-i in x or y-direction. Positions of the image sensor areas can be determined at least partly depending on a position of the center of the optical centers of the optical elements within the base area of the respective optical channel.

The schematic detailed view of a portion 23a in the upper part of the figure shows nine optical channels 24a-i, each including one image sensor area 25a-i. Based on the viewing direction of the respective optical channel 24a-i that is defined, for example, by the connecting line between optical center and image area center, the image sensor area 25a-i is displaced within a base area of the optical channels 24a-i as indicated by the dotted lines. Numbering within the optical channels merely serves to illustrate the arrangement of the partial area and a simplified differentiation of the optical channels. Depending on the orientation, i.e. viewing direction of the respective optical channel 24a-i as indicated by the numbering (1) to (9) (reference numbers in the figures are numbers 1 to 9 surrounded by circles), the optical channels 24a-i are configured to detect nine partial areas of the object area. Alternatively, the object area can also have any number of divisions into partial areas. Each partial area is detected by a number according to the number of portions 23a-d, such as four in the illustrated example.

The four portions 23a-d comprise exemplarily an identical sorting order of the optical channels 24a-i. In other words, each partial area 23*a-d* has an optical channel 24*a*, 24*b*, 24*c*, . . . , 24*i*, wherein the optical channels 24*a-i* are each arranged laterally adjacent in a single-line structure. The four partial areas 23*a-d* are each juxtaposed laterally, such that the total number of optical channels is also juxtaposed laterally within one line. The arrangement of the optical channels 24*a-i* is in a single line, which can also be described as a form 1×N. The line runs parallel to the lateral side 18*a* and the main sides 14 and 16.

The number of portions 23*a-d* can result from a super-resolution factor to be obtained. For obtaining the increase of the resolution by the desired superresolution factor, an according amount of optical channels can be configured in x-direction, wherein the respective channels 24*g*-1, 24*g*-2, 24*g*-3 and 24*g*-4 each view essentially the same partial area of the object area. In the respective partial areas, i.e. portions 23*a-d*, the image sensor areas 25*a* can be shifted in x and/or y-direction with regard to their allocated optical channels 24*g*-1 to 24*g*-4, for example by half a pixel, i.e. by a pixel pitch corresponding to half of an extension of a pixel in a direction lateral to a line direction. In that way, for example the image sensor areas 25*a* of portions 23*a* and 23*b* can differ in the x-direction and/or the y-direction with regard to their respectively allocated channels 24*a* by half a pixel and not differ in y-direction, the image sensor area 25*a* of the portion 23*c* can differ in y-direction and/or in x-direction by half a pixel from the image sensor area 25*a* of the portion 23*a* and the image sensor area 25*a* of the portion 23*d* can differ, for example, both in x- and y-direction by half a pixel with respect to the image sensor area 25*a* of the portion 23*a*. Thus, the number of portions 23 can also be referred to as product of superresolution factors in x- and y-direction, wherein the factors can differ from one another by integer numbers.

The optical channels 24*g*-1, 24*g*-2, 24*g*-3 and 24*g*-4 for detecting a partial area of the object area that is essentially equal, can have any lateral offset to one another in a direction perpendicular to a line direction and perpendicular to a direction of the distance X1, respectively. When this distance is a fraction, such as for example ¼, ⅓ or ½ of a distance between two pixels, i.e. partial image areas, this offset can also be referred to as subpixel offset. The subpixel offset can be based, for example, on a desired superresolution factor. If, for example, a superresolution factor of 2 is implemented and a partial area of the object area in x and y-direction is detected doubly, the subpixel offset can correspond, for example to ½ of the pixel width. The offset can be used, for example, for increasing a spatial resolution of the object area. In other words, due to interleaving of the optical channels, it is possible that scanning gaps of an optical channel are detected by an adjacent optical channel. Alternatively, the optical channels 24*g*-1, 24*g*-2, 24*g*-3 or 24*g*-4 can also be arranged without offset to one another for detecting an essentially equal partial area.

Due to the subpixel offset of the optical channels 24*g*-1, 24*g*-2, 24*g*-3 and/or 24*g*-4, which project the same partial area of the object, a high-resolution total image can be calculated from a plurality of low-resolution micro images per optical channel 24*g*-1, 24*g*-2, 24*g*-3 and/or 24*g*-4 by means of a superresolution algorithm. In other words, centers of the image sensor areas 25*g* of the optical channels 24*g*-1, 24*g*-2, 24*g*-3 and/or 24*g*-4 can be arranged in a shifted manner, such that at least two of the optical channels 24*g*-1, 24*g*-2, 24*g*-3 and/or 24*g*-4 have different partly overlapping detection areas with a pixel pitch or a fraction of a pixel pitch or a (sub) pixel offset. In that way, an overlap area of the detection areas of two optical channels 24*g*-1, 24*g*-2, 24*g*-3 and 24*g*-4 can be projected to an image detection sensor in an offset manner.

The identical sorting order of the partial areas 23*a-d* and hence the optical channels detecting an at least approximately equal partial area of the object area, such as of the optical channels 24*g*-1, 24*g*-2, 24*g*-3 and 24*g*-4 allows a greatest possible lateral distance along a formation of a line structure. As indicated by the distances between the image sensor areas 25*a-i* along the formation of the line structure, optical voids, i.e. gaps can be formed between the image sensor areas 25*a-i* of the optical channels 24*a-i*. In these gaps, i.e. in the areas between the partial image converters, for example, electronic components that are not sensitive to light, such as readout circuits, analog-digital converters (ADCs), amplifiers, etc. can be arranged.

The arrangement of the optical channels in the portions 23*as-d* is, for example, interleaved and regular, such that a distance X for optical channels detecting the same or approximately the same partial area is constant, such as for the optical channels 24*g*-1 to 24*g*-4 or 24*f*-1 and 24*f*2.

The distance X1 can be referred to both as maximum and as equidistant distance, since the same applies for each partial area 23*a-d* and each optical channel 24*a-i* of the respective partial area.

In other words, optical channels, which detect the approximately equal partial areas that are only offset by part of a field of view of a pixel, are spaced apart from one another in the strip-shaped arrangement by the distance X1 at a maximum. Thereby, great to maximum disparity can be obtained and hence in this regard an improved to best-possible depth resolution.

Alternative embodiments are, for example, multi-aperture devices having a greater number of optical channels. According to the superresolution principle, a number of portions 23*a-d* where the optical channels are partly arranged can be a square of a natural number, such as $2^2$, $3^2$ or $4^2$. Alternatively, it is also possible that a different number of portions is arranged in the multi-aperture device, such as, for example, 2, 3, 5, 7 or 11.

In other words, FIG. 3*a* shows an imaging system that is compact in x-direction with optimized acquisition of depth information due to a greatest possible base length X1. The optical channels of the multi-aperture device have a linear arrangement, i.e. the same are arranged in one line.

Figure 3B:
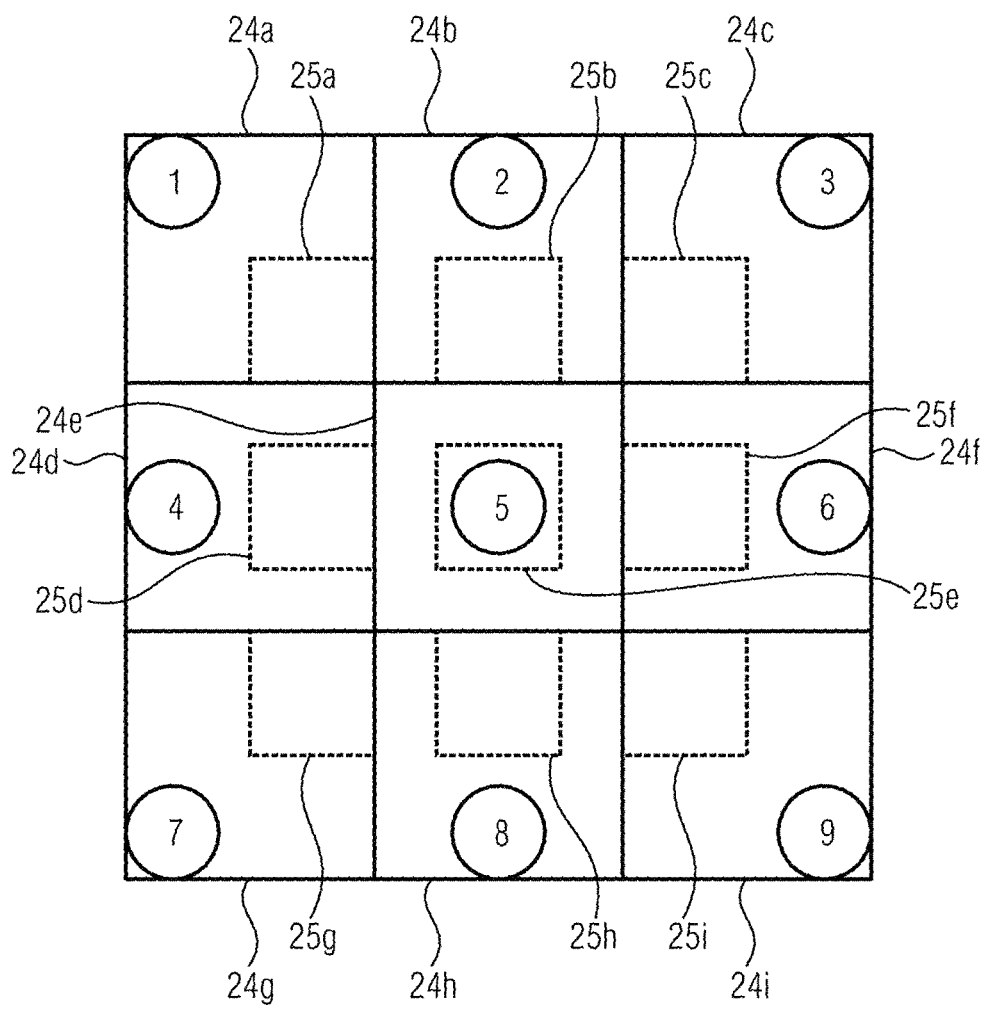
FIG. 3b is a schematic illustration of a two-dimensional arrangement of optical channels for detecting an object area where the arrangement of the image sensor area corresponds to a position of the partial area within the object area.

FIG. 3*b* shows exemplarily with regard to the arrangement of groups or portions of optical channels 24*a-i* of FIG. 3*a* the arrangement of the partial areas within the object area detected by the optical channels. Such an arrangement is described, for example in DE 10 2009 049387. As is stated, in each portion, each of the optical channels 24*a-i* is configured to detect a different partial area of the object area, as indicated by respectively shifted image sensor areas 25*a-i*. In other words, each of the optical channels 24*a-i* has a different viewing direction on the object area. The partial areas of adjacent optical channels, such as 24*a* and 24*b* or 24*e* and 24*f* or 24*d* and 24*g* overlap partly, this means adjacent optical channels partly detect the same image content in order to be able to infer an object distance. FIG. 3*b* merely shows an arrangement of optical channels for illustrating the influence of different viewing directions of optical channels. FIG. 3*b* corresponds to conventional technology and serves to illustrate the channel division. The optical channels 24*a-i* have a sorting such that optical channels 24*g*-1, 24*g*-2, 24*g*-3 and 24*g*-4 allocated in an approximately equal object area are separated from one another within the line, i.e. line structure, at a maximum by the distance X1.

FIG. 4a shows the schematic top view of the portion 23a of the multi-aperture device 21 with the sorting of the optical channels 24a-i as shown in FIG. 3a. Two adjacent optical channels, such as 24g and 24c and 24b, 24i and 24a or 24d and 24f can have a maximum angular distance with respect to the respective position of the image sensor area of the optical channel, for example 180° for the optical channels 14g and 24c. In other words, the viewing directions of two adjacent optical channels are rotated or mirrored by up to 180°. Adjacent optical channels, such as 24c and 24h or 24b and 24i have an angular distance between 90° and 180° to one another.

In other words, adjacent optical channels 24a-i of the portion 23a are arranged such that the same can have a maximum difference in their viewing direction.

As illustrated in FIG. 4a, the optical channels 24a-i can be arranged such that centers of the respective optical channels 24a-i, i.e. the optical centers are arranged along or on a straight line 17. This means that distances of the centers of the image sensor area 25a-i can vary with regard to the line 17. In other words, the centers of the optical channels 24a-i are co-linear.

FIG. 4b shows a schematic top view of a portion 23'a of a multi-aperture device 21'. The sorting order of the optical channels 24a-i along the line 17 is identical to the sorting order of FIG. 4a. Contrary to FIG. 4a, the optical channels 24a-i are offset along the linear arrangement of the line structure in y-direction, such that centers of the respective image sensor areas 25a-i are arranged co-linear on the line 17.

Alternatively, both the centers of the optical channels 24a-i and the image sensor areas 25a-i can be arranged partly or completely spaced apart from the line 17. In the case of square cross-sections of the optical channels 24a-i and the image sensor areas 25a-i, respectively, the centers can be determined based on the intersection of two diagonal lines connecting two opposite corners of the square. Alternatively, or in alternatively shaped optical channels 24a-i or image sensor areas 25a-i the centers can be determined, for example, based on the geometrical centroid of an area or center. Alternatively, a longitudinal center line of an optical channel 24a-i or image sensor area 25a-i can be used for describing the arrangement that is co-linear or spaced-apart from the line 17.

In other words, in FIG. 4b, the optical channels are arranged in the same order as in FIG. 4a but shifted in y-direction, i.e. laterally to the line direction such that the centers of the partial imagers, i.e. the image sensor areas 25a-i are on the line 17 and an envelope of an active partial imager area can hence have a minimum extension in y-direction. Thereby, a lowest possible height, i.e. minimum space requirements of an image sensor formed, for example, in a strip shape, can be obtained.

FIGS. 4a and 4b merely show a partial view of the multi-aperture device 21 and 21', respectively. All in all, one line, for example in dependence on a superresolution factor, consists of several, for example four lines, i.e. portions 23 and 23' that can be arranged behind one another and hence in one line. The partial imagers, i.e. image sensor areas 25a-i are shifted in a x/y-direction of the object area by a width of a respective pixel divided by the superresolution factor.

FIG. 4c shows an apparatus 39 with an arrangement of the image sensor areas 25a-i on a substrate 27 as it can result from an arrangement of the optical channels according to FIG. 4b. An arrangement of the centers of the image sensor areas 25a-i along a line 17 can result in a width Y1 of the substrate 27, hence in a smaller sensor surface of the image converter. The arrangement of the image sensor areas 25a-i unamended compared to FIG. 4b in x-direction can result in an entire extension in x-direction, X2. The apparatus 39 consisting of the substrate 27 with the image sensor areas 25a-i can also be referred to as imager.

By arranging the center of the image sensor areas 25a-i, all in all, reduction or minimization of the space requirements of the substrate 27 can be obtained, which can result in material savings and hence reduction of costs and/or installations space. The filling factor of the image sensor is defined by the ratio of the total area of all pixels arranged on the image sensor and contributing to the image area 25a-i to the entire area of the image sensor.

In other words, the centers of partial imagers 25a-i are on one line, such that an envelope whose entire extension in x and y-direction can approximately correspond to an extension of the substrate 27 in x and y-direction results in a low or possibly minimum extension Y1 perpendicular to the line 17 in y-direction. Thus, a smaller space requirement of the substrate 27 in y-direction on which the partial imagers, i.e. image sensor areas 25a-i are arranged results, and hence a high spatial efficiency of the substrate 27 and a high filling factor of the image sensor, respectively.

FIG. 4d shows, as a further embodiment, an imager 39' where, compared to FIG. 4c, the image sensor areas 25a-i are arranged equidistantly on the substrate 27. The individual image sensor areas have an extension in x-direction X4 at a spacing of X4'. The latter is measured from a center of a respective image sensor area to a center of the respective laterally closest image sensor area (in FIG. 4d shown exemplarily between image sensor areas 25b and 25i). This arrangement can result in a total extension in x-direction, X3.

Figure 4E:
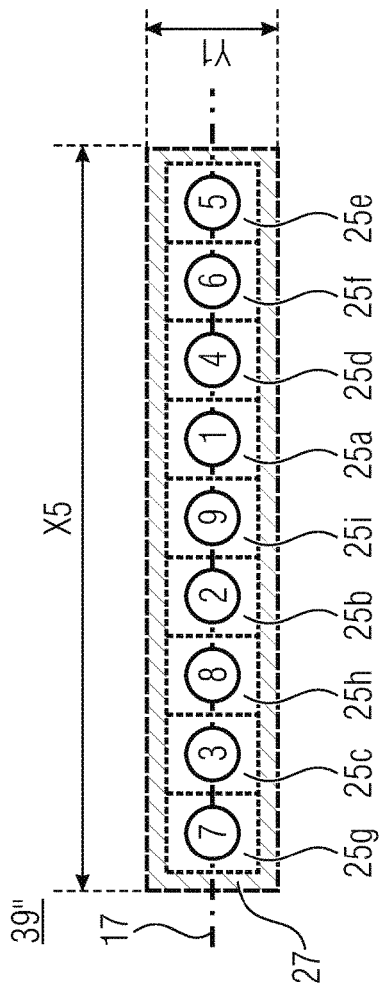
FIG. 4e is a schematic top view of a substrate having a plurality of image sensor areas juxtaposed without any gap.

FIG. 4e shows a further embodiment of the imager 39". Here, in contrary to FIG. 4d, the image sensor areas 25a-i are arranged on the substrate 27 such that no gaps are arranged between the respective individual areas. With constant extension in y-direction Y1, the entire apparatus can be less extended compared to the imager 39' (see FIG. 4d) in x-direction X5.

Figure 4F:
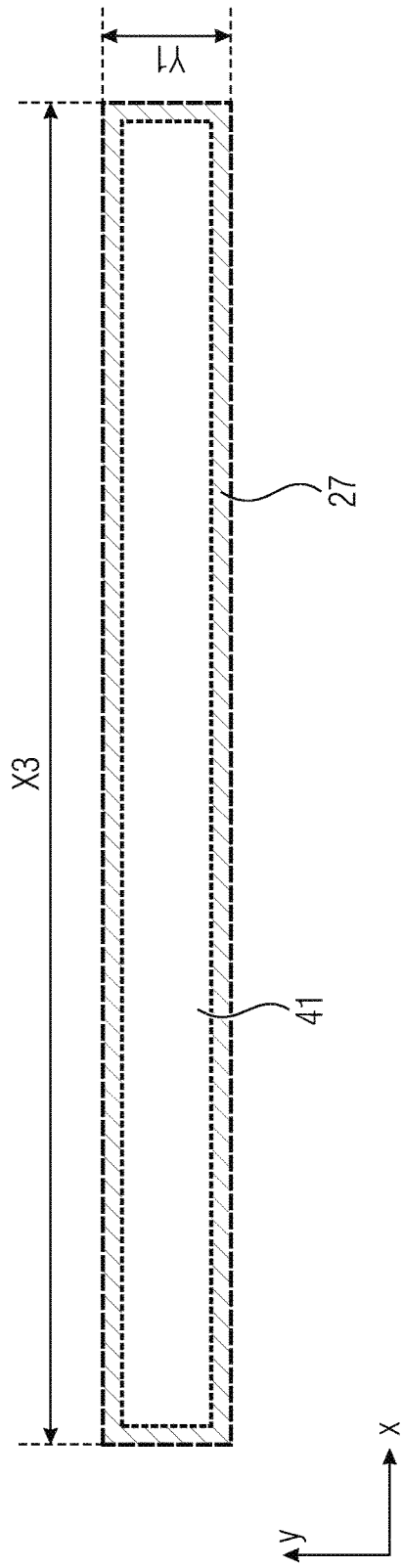
FIG. 4f is an imager according to FIG. 4b when further image sensor areas are arranged in the gaps between the image sensor areas.

FIG. 4f shows exemplarily an image as it can result from the apparatus 39' when further image sensor areas are arranged in the gaps between the image sensor areas 25a-i. In this case, division into individual areas can be omitted. Then, this can also be referred to as a longitudinal and continuous pixel field 41. In other words, the imager can also consist of only one longitudinal and continuous pixel field. For completeness sake, it should be mentioned that eliminating a division into individual areas can result in extensions in x- and y-direction X3 and Y1 that are unamended compared to the apparatus 39'.

It is an advantage of the imagers or image converters shown in FIGS. 4c-f that by integrating a respectively shaped multi-aperture device between the main sides of an apparatus for object detection, the demands on depth extension and thickness of the apparatus for object detection, respectively, can be eased. In other words, when incorporating the multi-aperture device between the main sides of the entire apparatus for image detection, the thickness of the apparatus is possibly determined by the extension in y-direction, Y1.

Figure 5A:
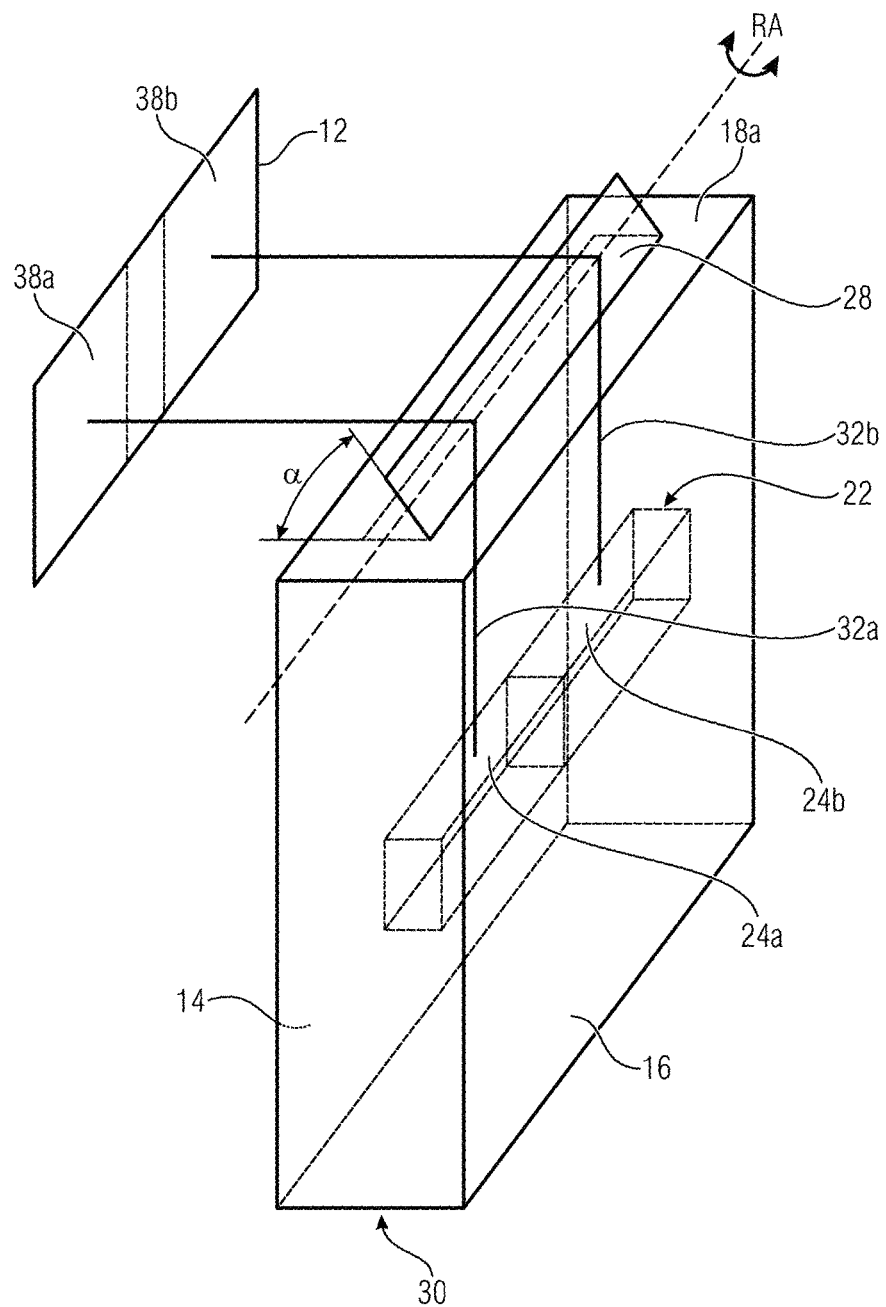
FIG. 5a is a perspective view of an apparatus for detecting an object area in a first state.

FIG. 5a shows a perspective view of an apparatus 30. The apparatus 30 includes the first main side 14, the second main side 16 and the lateral side 18a. Further, the apparatus 30 comprises the multi-aperture device 22 including the optical channel 24a as well as the optical channel 24d. Further, the apparatus 30 comprises the beam-deflecting element 28 arranged exemplarily in the lateral side 18a. The beam-deflecting element 28 is formed rotatably around an axis of rotation RA running along the lateral side 18a. Alternatively, the axis of rotation RA can run transversely to the optical axes 32a,b. The beam-deflecting element 28 is tilted by a rigid or variable angle α with respect to the lateral side 18a. The angle α is, for example, 45° and can also have differing degrees, such as 50, 80 or 90. If the angle α is, for example, 45°, the multi-aperture device 22 can detect the object area 12 along the optical axes 32a and 32b. Here, the optical axes 32a and 32b are respectively allocated to the optical channels 24a and 24b. The object area 12 is arranged parallel to the first main side 14 of the housing. In other words, the beam-deflecting element 28 is configured to reflectively deflect the optical axes 32a and 32b in a direction which is facing the first main side 14. The apparatus 30 with the above-described position of the beam-deflecting element 28 can referred to as being in the first state. The first state results from the position of the beam-deflecting element 28 such that the first state of the beam-deflecting element 28 also determines the first state of the apparatus 30.

Figure 5B:
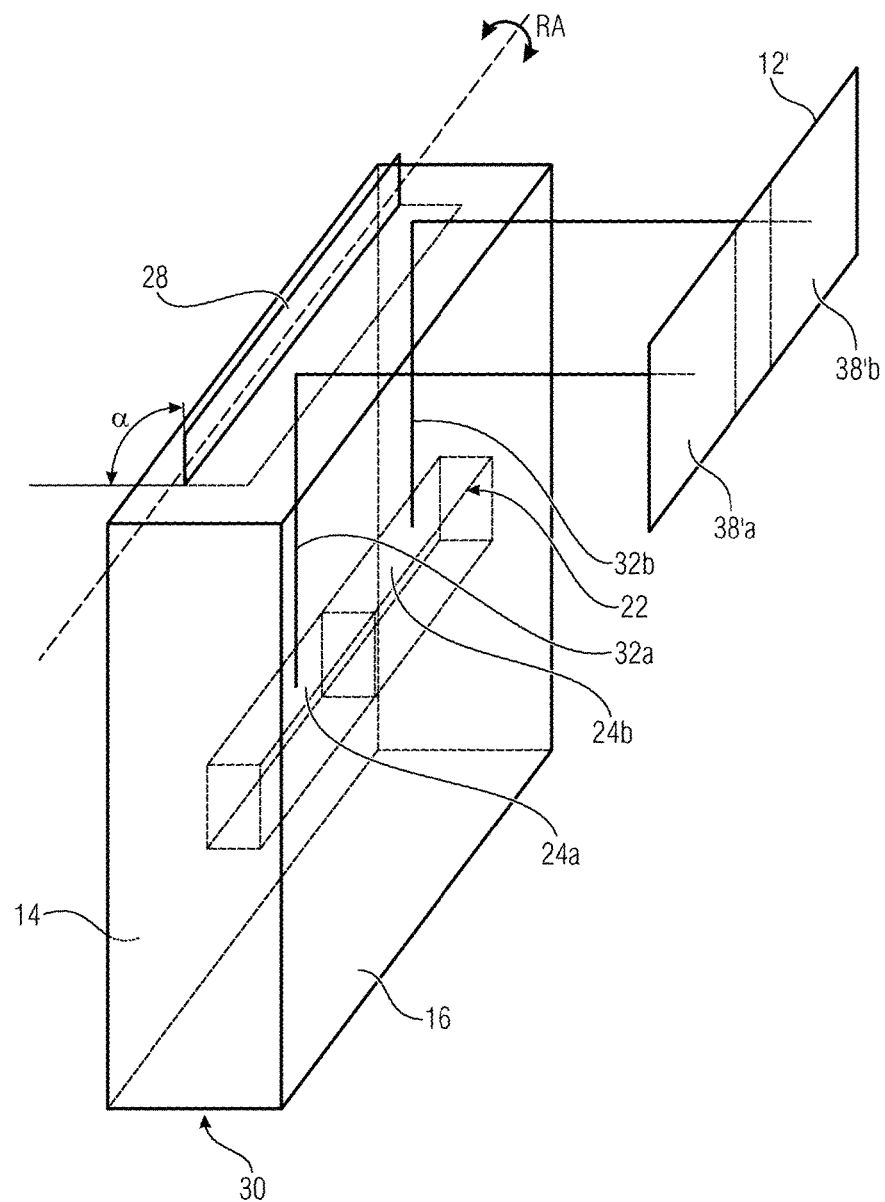
FIG. 5b is a perspective view of an apparatus for detecting an object area in a second state.

FIG. 5b again shows a perspective view of the apparatus 30. The beam-deflecting element 28 is now tilted such that the same has the angle α of 135° with respect to the lateral side 18a. In other words, the beam-deflecting element 28 is tilted by 90° with respect to the beam-deflecting element 28 in FIG. 5a. The beam-deflecting element 28 is configured to allow detection of a second object area 12' facing the second main side 16. The object area 12' includes partial areas 38'a and 38'b. The configuration of the beam-deflecting element 28 shown in FIG. 5b has the effect that the apparatus 30 is in a second state.

The apparatus 30 can be configured to be switchable between the first state and the second state. Switching can be performed, for example manually by a user or automatically by a respective control hardware and/or software. The apparatus 30 can further be configured to be used in the first state for video telephony and in the second state for capturing photos or videos. Here, it is advantageous that the multi-aperture device 30 can be used, by means of the beam-deflecting element 28, both for detecting the first object area 12 (facing the first main side 14) as well as for detecting the second object area 12' (facing the second main side 16). Compared to conventional technology, this embodiment is characterized by complexity reduction, since, by using an accordingly configured or configurable beam-deflecting element, two different and/or differently oriented camera modules are no longer necessitated for detecting two different object areas, i.e. differently arranged or positioned in space.

In other words, by reflective beam-deflection, two positions can be enabled: a first position characterized in that the viewing direction is oriented towards the front, hence in the direction of the second main side 16 (beam-deflection +90° with respect to the lateral side 18a), and a second position which is characterized in that the viewing direction is oriented towards the back, hence in the direction of the first main side 14 (beam-deflection −90° with respect to the lateral side 18a). It is an advantage of this embodiment that the different positions can enable the multi-aperture device 22 to take on the function of the first (primary) or second (secondary) camera module. Here, an imager plane is perpendicular to a screen plane while object planes can be parallel to the screen plane. This embodiment can alternatively be referred to as camera having adaptive beam-deflection.

Figure 6:
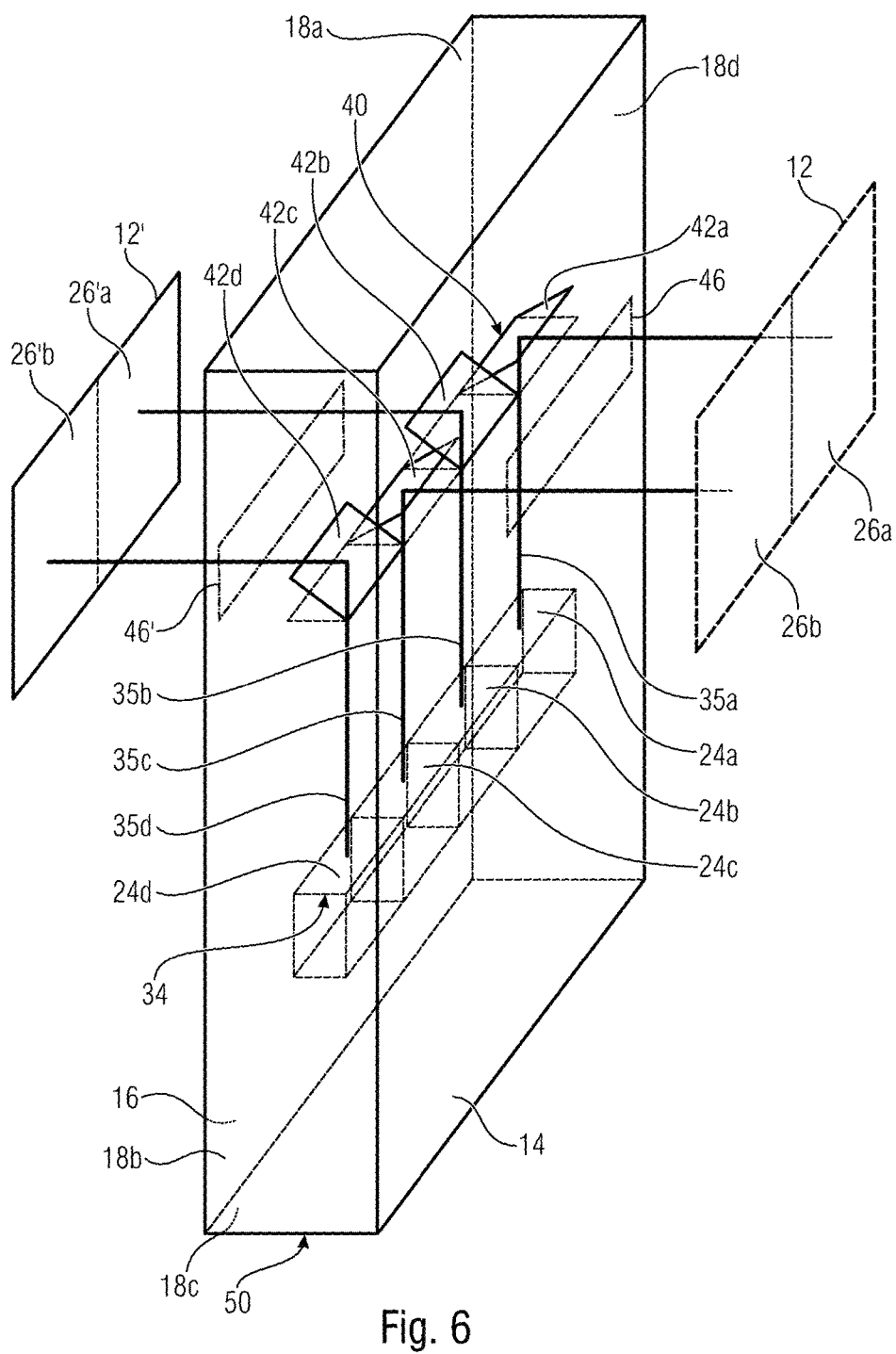
FIG. 6 is a perspective view of an apparatus for detecting an object area which can detect two different object areas simultaneously.

FIG. 6 shows a perspective view of an apparatus 50 which can be referred to as modification of the apparatus 20. The apparatus 50 also includes the first main side 14, the second main side 16 and the lateral sides 18a-d, the multi-aperture device 34, which includes the optical channels 24a-d, as well as the beam-deflecting element 40. The beam-deflecting element 40 is arranged parallel to the lateral side 18a in the apparatus 50.

Now, optical axes 35a, 35b, 35c and 35d are respectively allocated to the optical channels 24a-d. The same have an approximately parallel course between the multi-aperture device 34 and the beam-deflecting element 40.

The partial elements 42a-d are now configured such that a first group (35a and 35c) of optical axes 35a-d is deflected in the direction of the first main side 14 and a second group (35b and 35d) of optical axes 35a-d is deflected in the direction of the second main side 16.

In the first main side 14, an opening 46 is arranged such that the optical channels 24a and 24c can detect the object area 12 along the first group (35a and 35c) of optical axes through the main side (14). In the second main side 16, further, an opening 46' is arranged such that the optical channels 24b and 24d can detect the object area 12' along the second group (35b and 35d) of optical axes through the main side 16. The openings 46 and 46' can, for example, be an aperture, a view opening, a window, etc.

The apparatus 50 can detect two different, i.e. differently arranged or positioned object areas (12 and 12') simultaneously. The interleaved or alternating arrangement of the individual optical channels as described, for example, with reference to FIG. 4a or 4b, can for example also allow capturing of depth information of the respective object area. Here, it is not mandatory that channels viewing the object area 12 are arranged alternately to channels scanning the object area 12'. It is also possible that groups of channels scanning the same object area, i.e. 12 or 12' use the same deflection element. For example, 100 channels can be formed to detect the object area 12, followed by, along the linear arrangement of channels, 1000 further channels detecting the object area 12'.

It is also possible to form the beam-deflecting element 40 such that an individual change of the position of the respective partial elements 42a-d is enabled. For this, the individual elements 42a-d can be implemented to be tiltable with respect to the lateral side 18a in an arbitrary angle, for example each along a common or respective axis of rotation. In other words, a line-wise adaptation or change of the beam-deflecting element 40 can be enabled.

Alternatively, the beam-deflecting element 40 can also be a mirror having a non-planar form which is discontinuous or faceted across the extension of the entire imager. The same can be different for each channel of a multi-aperture camera. Alternatively, it is also possible that the mirror has a non-planar form that is continuous across the extension of the entire imager.

The apparatus 50 can, for example, be a camera with beam-deflection where some (optical) channels are oriented onto an object plane 1 by a beam-deflection element (for example, mirror, planar or bent/free form), others are oriented onto an object plane 2. The imager plane is, for example, perpendicular to a screen plane while the object planes 1 and 2 are parallel to the screen plane. In other words, the object plane 1 is detected along a main viewing direction of a partial camera 1 and the object plane 2 along a main viewing direction of a partial camera 2.

Figure 7:
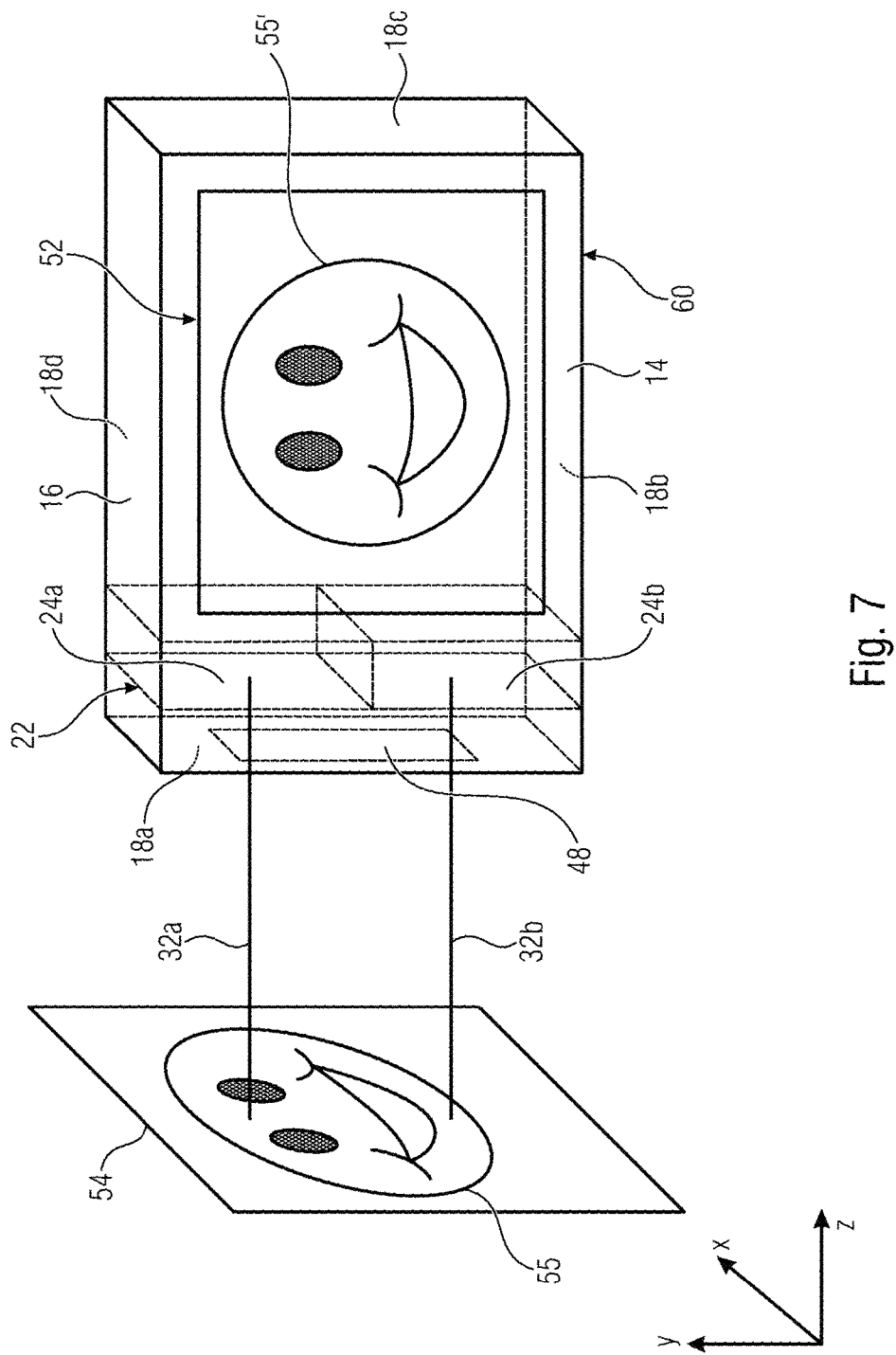
FIG. 7 is a perspective view of an apparatus for detecting an object area facing away from the two main sides.

FIG. 7 shows a perspective view of an apparatus 60 which can be referred to as modification of the apparatus 10. The apparatus 60 also includes the first main side 14, the second main side 16 and lateral sides 18*a-d* as well as the multi-aperture device 22 including the optical channels 24*a* and 24*b*. The optical axes 32*a* and 32*b* are allocated to the optical channels 24*a* and 24*b*.

The apparatus 60 is configured to detect an object area 54. The object area 54 is arranged parallel to the lateral side 18*a* and comprises an object 55 which can be detected by the multi-aperture device 22 along the optical axes 32*a* and 32*b* running laterally (in z-direction). For this, the optical axes 32*a* and 32*b* pass through an opening 48 through the lateral side 18*a*. Their course can be referred to as parallel in portions.

The apparatus 60 further comprises a screen 52 which is exemplarily arranged in the first main side 14. The screen 52 has an extension in y and z-direction and can have a surface area which is at least half of the one of the first main side 14. A surface area that is smaller, the same or greater than the surface area of the first main side is also possible. The screen 52 can be configured to illustrate an image. The object 55 can, for example, be detected and be provided to a user as image 55'. This image 55' of the object 52 is exemplarily arranged in the screen 52.

The apparatus 60 is configured to detect an object area facing away from the two main sides 14 and 16. In other words, an object area arranged parallel to the lateral side 18*a* can be detected. In this case, this can also be referred to as an imager plane (cf. 31 in FIG. 1) which is arranged perpendicular to a screen plane.

In other words, in the apparatus 60, a camera can detect an object area in a straight forward view (without deflection) along a main viewing direction.

Since the object 55 is detected by at least two optical channels 24*a* and 24*b*, the image 55' can also comprise depth information.

The apparatus 60 can, for example, be a multi-aperture camera with a division of the field of view in a linear implementation in a smartphone. Here, a possible accommodation (of the multi-aperture camera) at the front side of the smartphone is advantageous. It is also possible that the multi-aperture device 22 comprises an imager, which, as shown in FIG. 4*f*, only consists of one longitudinal and continuous pixel field.

It is an advantage of this embodiment that the camera is made out of a small strip. Thereby, lower thickness of the smartphone is possible.

Figure 8:
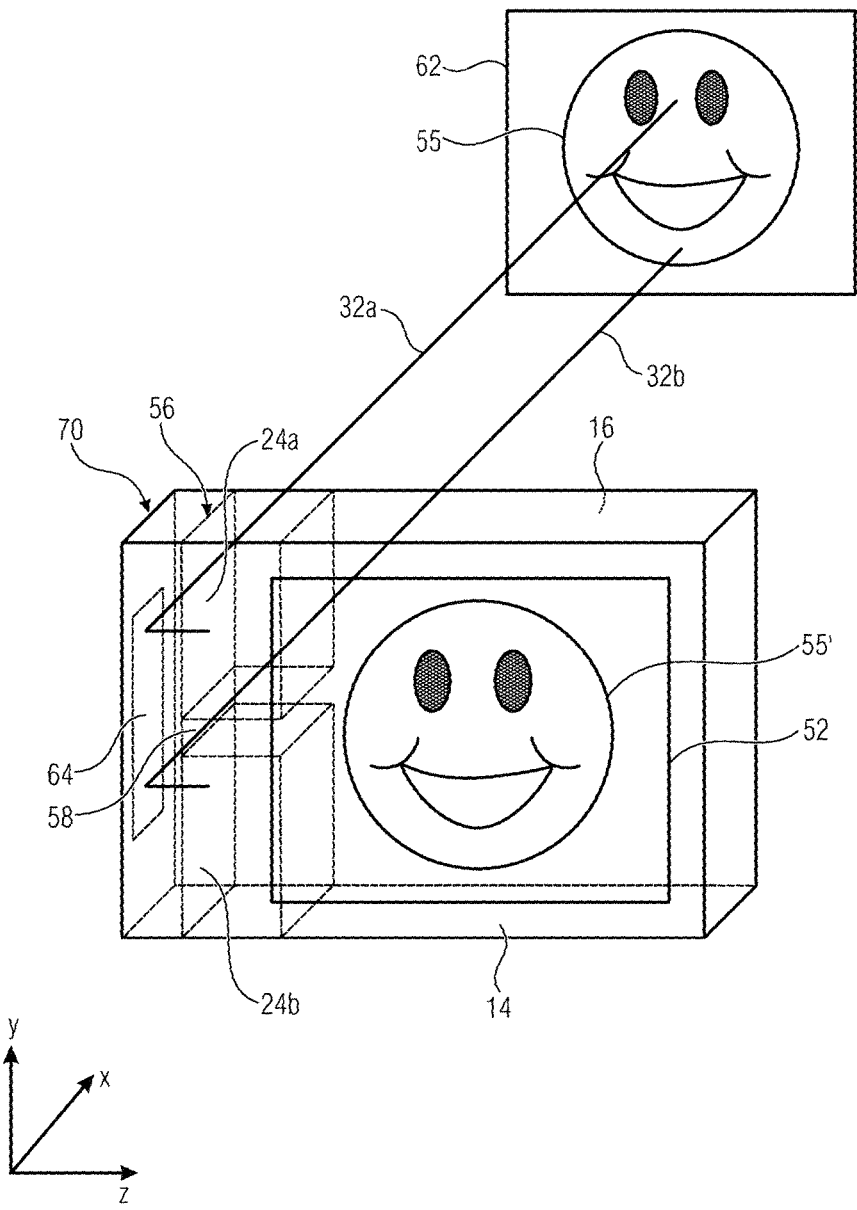
FIG. 8 is a perspective view of an apparatus for detecting an object area facing the second main side additionally comprising a flash device arranged in the multi-aperture device.

FIG. 8 shows a perspective view of an apparatus 70 which can be referred to as modification of the apparatus 60. Now, a multi-aperture device 56 is arranged at the position of the multi-aperture device 22 (see FIG. 7), which comprises, in addition to the optical axes 24*a* and 24*b*, a flash device 58. The same is arranged exemplarily between the optical channels 24*a* and 24*b* and is configured to illuminate an object area 62. The object area 62 is arranged parallel to the second main side 16 and comprises the object 55.

The arrangement of the flash device 58 in the multi-aperture device 56 can result in easing design demands regarding the depth extension of the flash device. It is also advantageous that a respective control and/or link of the flash device with the other elements of the multi-aperture device 56 could be easily performed due to the spatial proximity. The flash device 56 can be implemented, for example with one or several light emitting diodes (LEDs), but other embodiments are also possible. Alternatively, integration of the multi-aperture device 56 and hence the flash device 58 can take place at a front side of the apparatus 70.

A beam-deflecting element 64 is now arranged at the position of the opening 48 (see FIG. 7). The beam-deflecting element 64 is configured to deflect the optical axes 32*a* and 32*b* from a lateral course (in z-direction) towards a non-lateral course (in x-direction), such that the object area 62 and hence the object 55 arranged therein can be detected by the optical channels 24*a* and 24*b*.

The beam-deflecting element 54 is further configured to deflect electromagnetic waves (light) emitted by the flash device 58 in the direction of the second main side 16. Hence, the object area 62 can be illuminated. In other words, usage of beam-deflecting elements (mirrors) can be enabled for the flash device 58. Further, the flash device 58 can be formed for usage of a reflective and/or refractive beam deflection element.

The beam-deflecting element 64 can be configured in a rigid manner, such that the deflection of the optical axes 32*a,b* and the light emitted by the flash device 58 takes place in an unamended manner. However, it is also possible that the beam-deflecting element 64 is formed in a variable manner. If the beam-deflecting element 64 is, for example, a mirror or any surface reflecting electromagnetic waves, the same can be pivoted around an axis of rotation. A change or shift of the position of the beam-deflecting element 64 could be performed manually or by a respective control device or software and/or in an automated manner.

Thus, for example, beam-deflection via a simple continuous planar mirror can be enabled. Here, the mirror plane can be inclined by 45° to the screen plane. This configuration can possibly be described by deflecting the main viewing direction in the direction of the second main side.

The configuration of multi-aperture device, flash device and beam-deflecting element described herein could result in further advantageous embodiments of the apparatus for object detection.

Figure 9A:
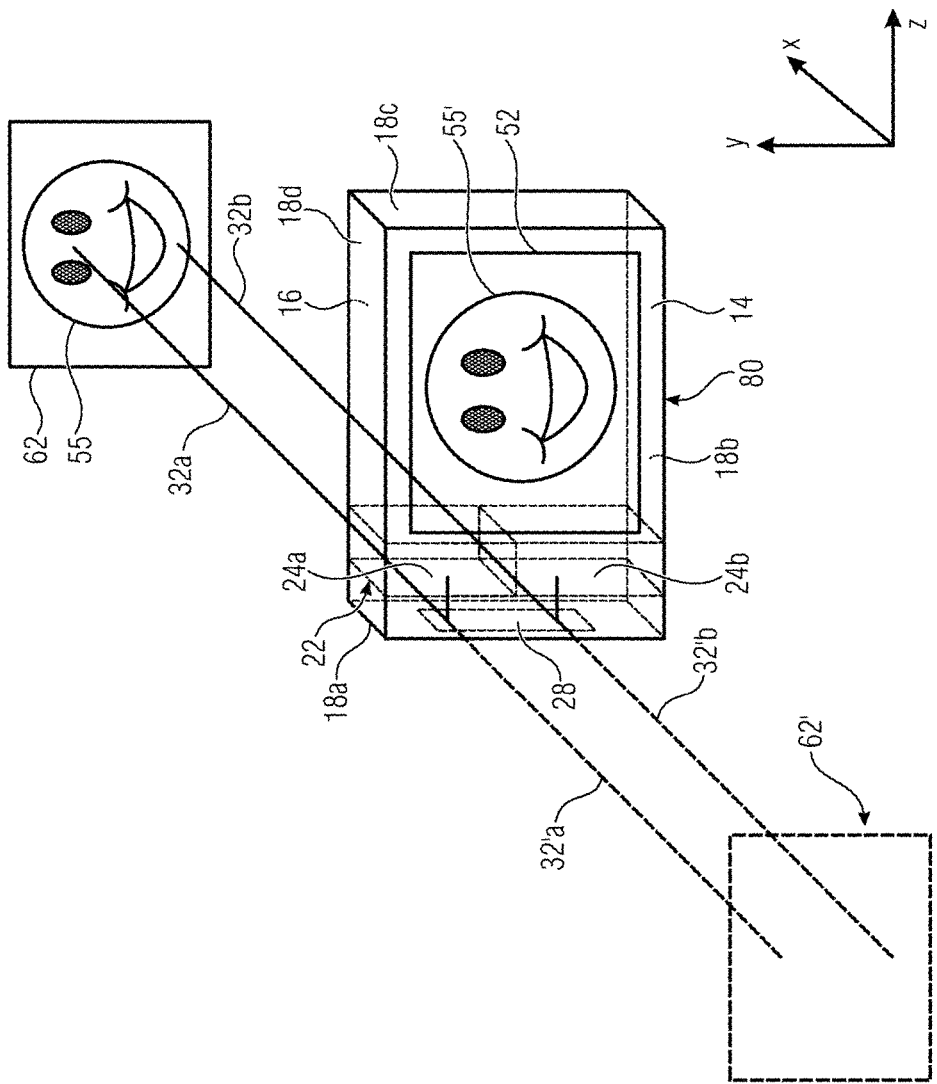
FIG. 9a a perspective view of an apparatus for detecting two object areas in a first state allowing the detection of an object area facing the second main side.

As a further embodiment, FIG. 9*a* shows an apparatus 80 that can be derived from the apparatus 30 in a first state. The first state results from the position of the beam-deflecting elements 28 such that the first state of the beam-deflecting element 28 also determines the first state of the apparatus 80. The first state can allow the detection of the object area 62 facing the second main side 16.

Further, the beam-deflecting element 28 allows the deflection of the optical axes 32*a* and 32*b* towards the optical axes 32'*a* and 32'*b* and the detection of a second object area 62' which faces the first main side 14. This configuration can be referred to as second state.

The apparatus 80 further comprises a screen 52 which can be formed, as in the apparatus 60 (see FIG. 7) for displaying an image 55' of a detected object 55.

Figure 9B:
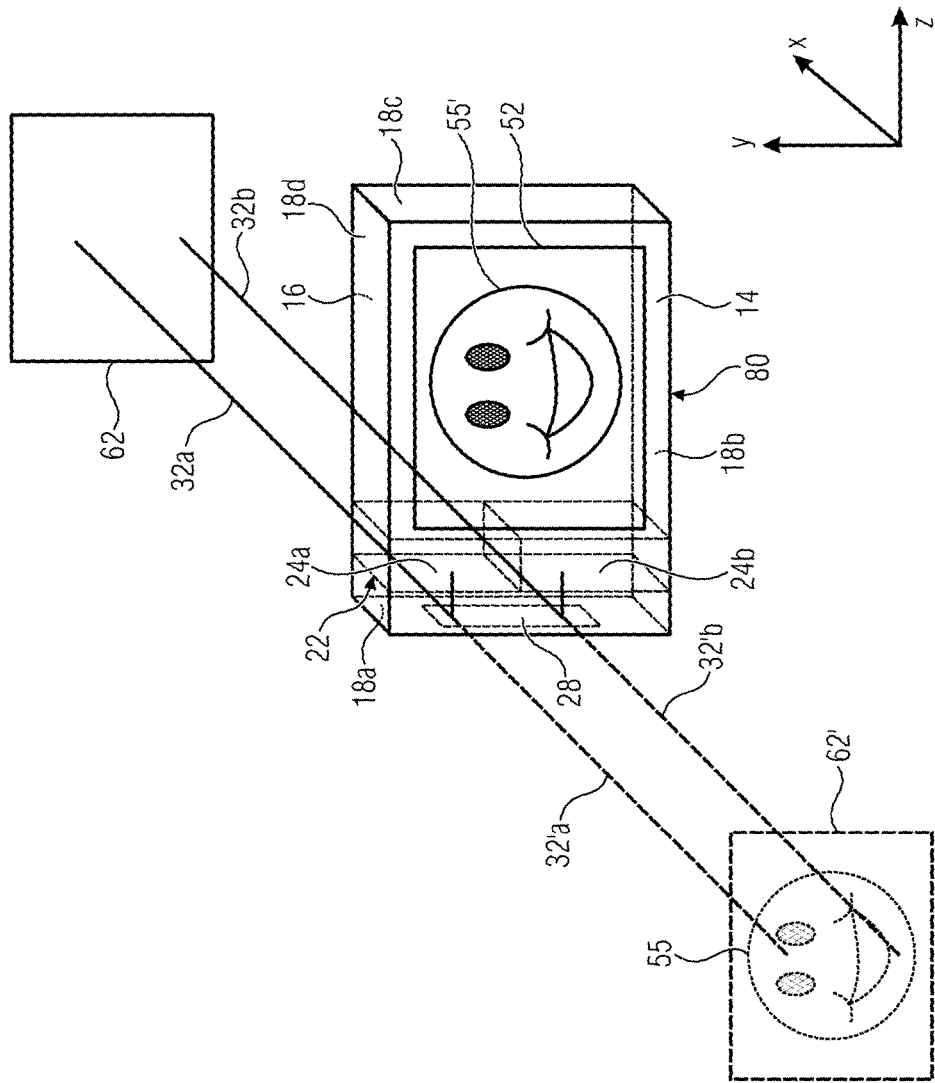
FIG. 9b is a perspective view of an apparatus for detecting two object areas in a second state allowing the detection of an object area facing the first main side.

FIG. 9*b* shows the apparatus 80 in a second state. The optical axes 32*a* and 32*b* are now projected on the optical axes 32'*a* and 32'*b*. In this configuration, the apparatus 80 can be configured to detect the object area 62'. Thus, the object 55 to be detected is exemplarily arranged in the object area 62'.

Figure 10:
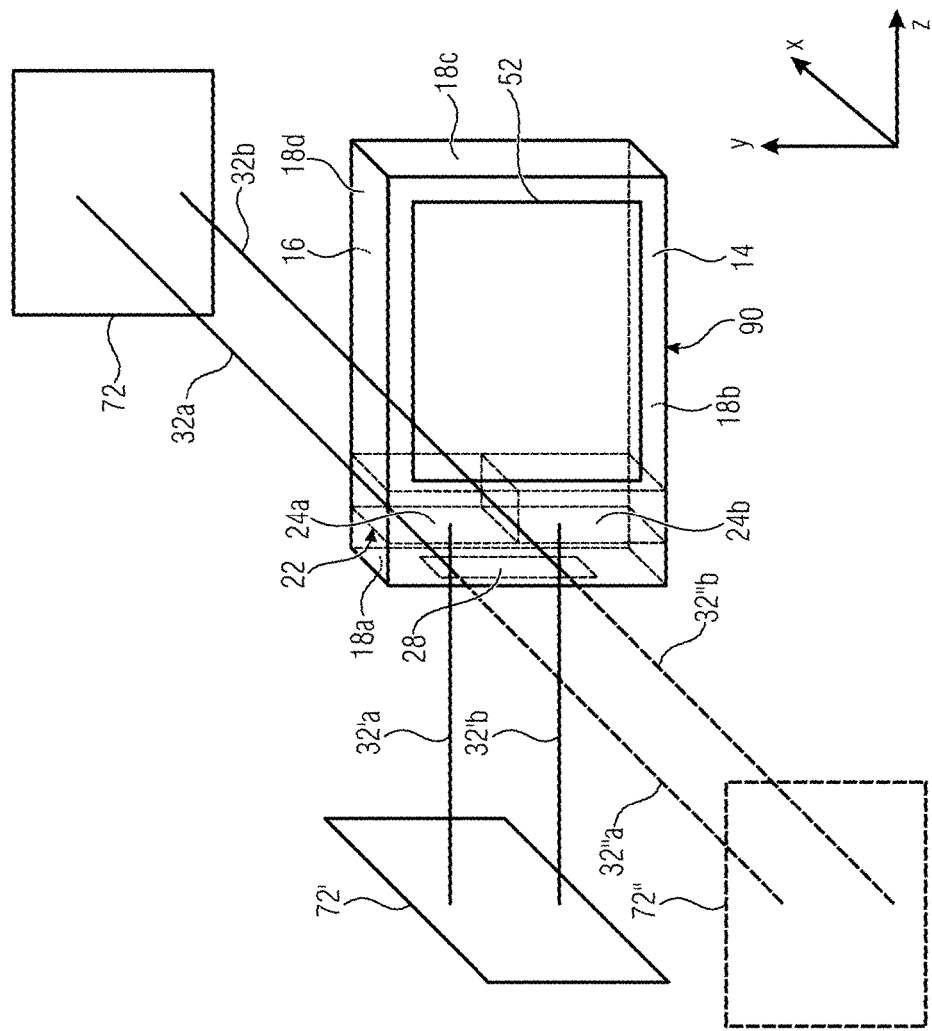
FIG. 10 is a perspective view of an apparatus for detecting three different object areas.
Figure 11:
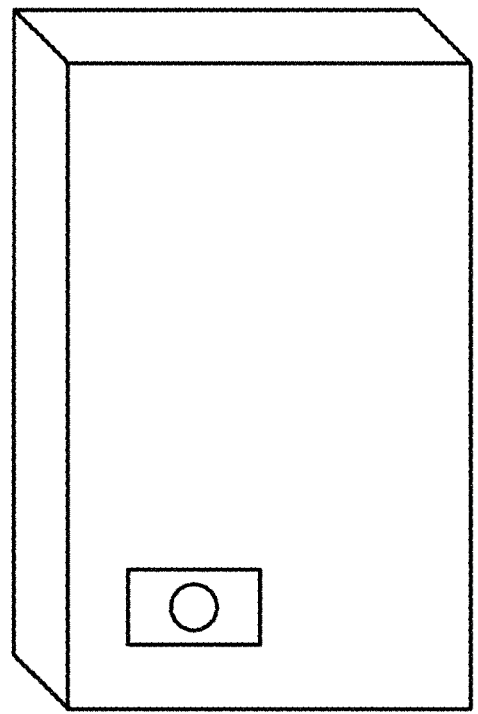
FIG. 11 shows a conventional camera and two camera modules in a smartphone according to conventional technology.
Figure 11:
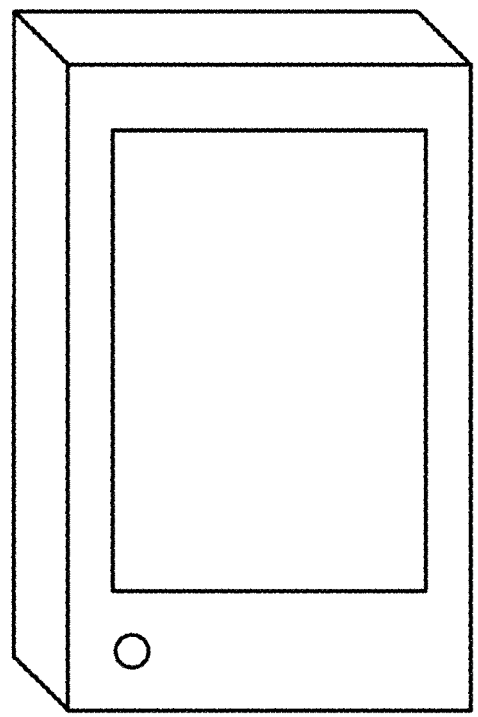

As a further embodiment, FIG. 10 shows an apparatus 90 that can be referred to as modification of the apparatus 80. The beam-deflecting element 28 is now configured to allow detection of three different object areas 72, 72' and 72" along optical axes 32*a* and 32*b*, 32*b*, 32'*a* and 32'*b* as well as 32"*a* and 32"*b*. In other words, the optical axes 32*a* and 32*b* can be projected respectively on optical axes 32'*a* and 32'*b* by means of the beam-deflecting element 28. Alternatively, for example, the optical axes 32'*a* and 32'*b* can be projected on the optical axes 32*a* and 32*b* or the optical axes 32"*a* and 32"*b*, or the optical axes 32"*a* and 32"*b* on the optical axes 32'a and 32'b, etc. Alternatively, deflection can be performed such that three differently arranged object areas 12, 12' and 12" can be detected.

Thus, possibly three positions can be differentiated: a first position characterized in that the viewing direction is deflected to the front (deflection)+90°, a second position which is characterized in that the viewing direction is deflected laterally or not (no deflection or 0°) and a third position which is characterized in that deflection takes place to the back (deflection −) 90°. Thus, possibly three different object planes that can be differently positioned and/or oriented in space can be detected with a single multi-aperture device 22. Here, it is also possible that the object area 72, 72' or 72" to be detected and an object possibly arranged in the respective object area, respectively, is displayed to the user with the help of a screen 52 arranged in the first main side 14.

In other words, (additional) beam-deflection can be performed by fixed/movable reflective components. Here, two, three or more positions are possible. Deflection can be performed, for example, at a planar mirror or a mirror that is continuous across all cells, but also via a mirror adapted cell-by-cell.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus for detecting an object area comprising:
a flat housing comprising a first main side, a second main side and a lateral side; and
a multi-aperture device, comprising:
a plurality of laterally juxtaposed optical channels facing the lateral side, wherein each optical channel is configured to detect a respective partial area of the object area through the lateral side or along an optical axis of the respective optical channel that is deflected between a lateral course within the housing and a non-lateral course outside the housing, wherein the partial areas of the optical channels cover the object area;
wherein each optical channel is associated with a partial area of the object area, wherein the plurality of optical channels comprises a first group of optical channels having at least two optical channels and a second group of optical channels having at least two optical channels, wherein optical channels of the second group are distinct from optical channels of the first group, wherein the first group of optical channels detects a first partial area of the object area and the second group of optical channels detects a second partial area of the object area; and/or
wherein the plurality of optical channels forms a one-dimensional array, and centers of the partial areas are juxtaposed along a first direction, so as to form a one-dimensional array transversal to the first direction and along a second direction.

2. Apparatus according to claim 1, wherein the plurality of optical channels forms a one-dimensional array while the partial areas of the object area cover a two-dimensional array.

3. Apparatus according to claim 1, wherein the first partial area and the second partial area overlap at least partly.

4. Apparatus according to claim 1, wherein a number of optical channels of the first group is equal to a number of optical channels of the second group.

5. Apparatus according to claim 1, wherein centers of pixel arrays of image sensor areas of the optical channels of the first group are laterally shifted to one another by a fractional amount of less than 1 of a pixel pitch with respect to centers of allocated imaging optics of the optical channels of the first group, such that the first partial area is scanned by at least two of the optical channels of the first group laterally shifted to one another by a subpixel offset, such that the optical channels of the first group each view essentially the same partial area of the object area and in the respective partial areas image sensor areas are shifted with regard to their allocated optical channels corresponding to the fractional amount of an extension of a pixel.

6. Apparatus according to claim 1, wherein the optical channels of the first and second group are arranged interleaved in a single-line structure.

7. Apparatus according to claim 1, wherein optical centers of optics of the optical channels of the first and second group are arranged on a first line and centers of image sensor areas of the optical channels of the first and second application Ser. No. 15/400,067 group are offset within the image plane with respect to a projection of the optical centers on a second line in an in an image plane in which the image sensor areas of the first and second group of channels are arranged.

8. Apparatus according to claim 1, wherein centers of image sensor areas of the optical channels of the first and second group are arranged on a first line and optical centers of optics of the optical channels of the first and second group are offset in the optics plane with respect to a projection of the centers of image sensor areas on a second line in an optics plane in which the optics of the optical channels of the first and the second group are arranged.

9. Apparatus according to claim 1 wherein the apparatus comprises a beam-deflecting element configured to deflect the optical axes of the plurality of optical channels in a first state in a direction which is facing the first main side and to deflect the same in a second state in a direction which is facing the second main side, wherein the beam-deflecting element can be switched between the first state and the second state.

10. Apparatus according to claim 9, wherein the beam-deflecting element comprises:
a rigid body with a mirroring surface pivotable around an axis of rotation that runs transversely to the optical axes of the plurality of the optical channels or along the lateral side in order to switch between the first state and the second state.

11. Apparatus according to claim 1, wherein the multi-aperture device further comprises a further plurality of optical channels, each being configured to detect a respective partial area of a further object area along a further optical axis which is deflected between a lateral course and a non-lateral course.

12. Apparatus according to claim 1, wherein the first main side comprises a screen.

13. Apparatus according to claim 1, wherein the apparatus is a mobile phone, a computer screen or a TV device.

14. Method for detecting an object area with an apparatus according to claim 1, the method comprising:
detecting the object area with the plurality of laterally juxtaposed optical channels facing the lateral side, wherein each optical channel is configured to detect a respective partial area of the object area through the lateral side or along an optical axis of the respective optical channel that is deflected between a lateral course within the housing and a non-lateral course outside the housing, wherein the partial areas of the optical channels cover the object area.

15. Apparatus according to claim 1, wherein the apparatus is implemented such that each optical channel is configured to detect the respective partial area of the object area along the optical axis of the respective optical channel that is deflected between the lateral course within the housing and the non-lateral course outside the housing, wherein the apparatus comprises a beam-deflecting element configured to deflect the optical axes of the plurality of optical channels.

16. Apparatus for detecting an object area comprising:
- a flat housing comprising a first main side, a second main side and a lateral side; and
- a multi-aperture device, comprising:
- a plurality of laterally juxtaposed optical channels facing the lateral side, wherein each optical channel is configured to detect a respective partial area of the object area through the lateral side or along an optical axis of the respective optical channel that is deflected between a lateral course within the housing and a non-lateral course outside the housing, wherein the partial areas of the optical channels cover the object area,
- wherein the multi-aperture device further comprises a further plurality of optical channels, each being configured to detect a respective partial area of a further object area along a further optical axis which is deflected between a lateral course and a non-lateral course.

* * * * *

UNITED STATES PATENT AND TRADEMARK OFFICE
CERTIFICATE OF CORRECTION

PATENT NO. : 10,425,567 B2  
APPLICATION NO. : 15/400067  
DATED : September 24, 2019  
INVENTOR(S) : Frank Wippermann et al.

Page 1 of 1

It is certified that error appears in the above-identified patent and that said Letters Patent is hereby corrected as shown below:

In the Claims

Claim 7, Column 18, Lines 23 and 24:  
Please change "...first and second application Ser. No. 15/400,067 group are offset..."  
To read: --first and second application group are offset...--.

Signed and Sealed this  
Twenty-second Day of December, 2020

Andrei Iancu  
*Director of the United States Patent and Trademark Office*